United States Patent
Maeda et al.

(10) Patent No.: US 11,294,376 B2
(45) Date of Patent: Apr. 5, 2022

(54) MOVING BODY CONTROL DEVICE

(71) Applicant: HITACHI, LTD., Tokyo (JP)

(72) Inventors: Kenta Maeda, Tokyo (JP); Junya Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/960,411

(22) PCT Filed: Mar. 16, 2018

(86) PCT No.: PCT/JP2018/010407
§ 371 (c)(1),
(2) Date: Jul. 7, 2020

(87) PCT Pub. No.: WO2019/176083
PCT Pub. Date: Sep. 19, 2019

(65) Prior Publication Data
US 2020/0341470 A1 Oct. 29, 2020

(51) Int. Cl.
*G05D 1/00* (2006.01)
*G01C 21/00* (2006.01)
(Continued)

(52) U.S. Cl.
CPC ........... *G05D 1/0088* (2013.01); *G01C 21/30* (2013.01); *G01C 21/3819* (2020.08);
(Continued)

(58) Field of Classification Search
CPC ............... G05D 1/0088; G05D 1/0223; G05D 2201/0213; G05D 1/0282; G01C 21/3822;
(Continued)

(56) References Cited

U.S. PATENT DOCUMENTS

| 2008/0091318 A1* | 4/2008 | Deng | ..................... B62D 6/003 |
| | | | 701/41 |
| 2010/0106397 A1* | 4/2010 | Van Essen | ............. G01C 21/34 |
| | | | 701/532 |

(Continued)

FOREIGN PATENT DOCUMENTS

| JP | 2007-183432 A | 7/2007 |
| JP | 2010-525302 A | 7/2010 |

(Continued)

OTHER PUBLICATIONS

International Search Report, PCT/JP2018/010407, dated May 15, 2018, 2 pgs.

*Primary Examiner* — Thomas Ingram
(74) *Attorney, Agent, or Firm* — Volpe Koenig

(57) ABSTRACT

A moving body control device expands an autonomously movable region, appropriately determines reliability of the expanded region, and realizes stable autonomous movement at low cost. The device includes: an external map acquisition unit acquiring an external map; a sensor acquiring external environment information around the moving body; a movement information acquisition unit acquiring movement information indicating a position or an advancing angle of the moving body; an autonomous movement range management unit generating an autonomous movement map based on the external information or the movement information; and a control unit controlling movement of the moving body based on the autonomous movement map, the external environment information, or the movement information, the autonomous movement range management unit comparing the autonomous movement map with the external map, the control unit controlling the moving body based on a comparison result in the autonomous movement range management unit.

14 Claims, 20 Drawing Sheets

TARGET MOVEMENT ROUTES 91 AND 92

CHANGE OF DEVIATION 102

(51) Int. Cl.
*G01C 21/30* (2006.01)
*G05D 1/02* (2020.01)

(52) U.S. Cl.
CPC ..... *G01C 21/3822* (2020.08); *G01C 21/3885* (2020.08); *G05D 1/0223* (2013.01); *G05D 2201/0213* (2013.01)

(58) Field of Classification Search
CPC ............ G01C 21/3885; G01C 21/3819; G01C 21/30; G01C 21/28; B60W 30/10; G08G 1/16; G09B 29/00
See application file for complete search history.

(56) References Cited

U.S. PATENT DOCUMENTS

| | | | |
|---|---|---|---|
| 2016/0259335 A1* | 9/2016 | Oyama | G05D 1/0251 |
| 2017/0259820 A1* | 9/2017 | Takahashi | G08G 1/22 |
| 2018/0328744 A1* | 11/2018 | Miyake | G08G 1/0141 |
| 2019/0004939 A1* | 1/2019 | Fujisaki | G06F 12/06 |
| 2019/0276049 A1* | 9/2019 | Kinoshita | G08G 1/167 |

FOREIGN PATENT DOCUMENTS

| | | | |
|---|---|---|---|
| JP | 2016-162299 A | 9/2016 | |
| JP | 2017-024675 A | 2/2017 | |
| JP | 2017-091370 A | 5/2017 | |
| WO | 2016/038931 A1 | 3/2016 | |
| WO | 2017/145361 A1 | 8/2017 | |

* cited by examiner

ACQUISITION OF INITIAL EXTERNAL ENVIRONMENT INFORMATION 13

GENERATION OF INITIAL AUTONOMOUS MOVEMENT MAP 8

ACQUISITION OF SECOND EXTERNAL INFORMATION 13
AND CORRECTION OF HOST VEHICLE POSITION 21

UPDATE OF AUTONOMOUS MOVEMENT MAP 8

EXTERNAL ENVIRONMENT INFORMATION 13
DURING MANUAL TRAVEL

EXTERNAL ENVIRONMENT INFORMATION 13
AND VEHICLE INFORMATION
DURING AUTONOMOUS TRAVEL

POSSIBILITY OF AUTONOMOUS TRAVEL

TARGET MOVEMENT ROUTES 91 AND 92

CHANGE OF DEVIATION 102

CHANGE OF SPEED 101

TARGET MOVEMENT ROUTES 91 AND 92

CHANGE OF DEVIATION 102

CHANGE OF SPEED 101

TARGET MOVEMENT ROUTES 91 AND 92

CHANGE OF DEVIATION 102

CHANGE OF SPEED 101

TARGET MOVEMENT ROUTES 91 AND 92

CHANGE OF DEVIATION 102

CHANGE OF SPEED 101

ERROR OF LANDMARK BETWEEN AUTONOMOUS MOVEMENT MAP 8 AND EXTERNAL MAP 12

RELATIONSHIP BETWEEN EXTERNAL MAP 12 AND AUTONOMOUS MOVEMENT MAP 8

COMPARISON BETWEEN AUTONOMOUS MOVEMENT MAP 8
AND EXTERNAL ENVIRONMENT INFORMATION 13

EXPANSION OF AUTONOMOUS MOVEMENT MAP 8

AUTONOMOUS MOVEMENT MAP 8

INITIAL AUTONOMOUS MOVEMENT MAP 8a

AUTONOMOUS MOVEMENT MAPS 8b AND 8c EXPANDED BASED ON SIMILARITY

SIMILARITY FOR EACH SECTION

SPEED

MOVING BODY CONTROL DEVICE

TECHNICAL FIELD

The present invention relates to a moving body such as an automobile and a robot that sequentially expands a region in which automatic driving (autonomous movement) is possible, and a moving body control device used for the same.

BACKGROUND ART

There is known a technique for generating a map based on travel data of a vehicle and the like, and sequentially expanding a region in which automatic driving (autonomous movement) is possible in an automatic manner. For example, the abstract of PTL 1 discloses an "automatic travel map creation device" that divides a region along a road into many small regions, stores a map in which a weight indicating existence of a measurement target is associated with each of the small regions, and adds the weight indicating the existence of the measurement target in a small region corresponding to position data using the position data of the measurement target obtained whenever a vehicle equipped with a measurement device travels the road.

Further, the abstract of PTL 2 discloses a "travel control device" that determines a speed and the like during automatic driving in accordance with reliability of a map and the like at the time of performing automatic driving using map information when the frontward environment recognition precision of a vehicle is determined as "low".

CITATION LIST

Patent Literature

PTL 1: JP 2007-183432 A
PTL 2: JP 2016-162299 A

SUMMARY OF INVENTION

Technical Problem

PTL 2 assumes that the reliability of the map information used for the automatic driving (autonomous movement) is known. However, when an automatic travel map is created based on vehicle sensor information acquired during first travel, and the automatic driving (autonomous movement) is performed using the map during subsequent travel as in PTL 1, the reliability of the map created based on the vehicle sensor information whose reliability is unknown is also unknown, and thus, there is a problem that it is difficult to execute control of a speed and the like during the automatic driving in PTL 2 in which the reliability of the map (map information) is essential.

The present invention has been made in view of such circumstances, and an object thereof is to provide a moving body and a moving body control device that can determine precision and reliability of a map even when the map created during travel based on vehicle sensor information is used for autonomous movement, and can realize autonomous movement control in response to the precision and reliability.

Solution to Problem

In order to achieve the above object, a moving body control device according to the present invention is a moving body control device including: an external map acquisition unit that acquires an external map; a sensor that acquires external environment information around the moving body; a movement information acquisition unit that acquires movement information indicating a position or an advancing angle of the moving body; an autonomous movement range management unit that generates an autonomous movement map based on the external information or the movement information; and a control unit that controls movement of the moving body based on the autonomous movement map, the external environment information, or the movement information. The autonomous movement range management unit comparing the autonomous movement map with the external map, the control unit controlling a behavior of the moving body based on a comparison result in the autonomous movement range management unit.

Advantageous Effects of Invention

According to the present invention, it is possible to provide the moving body and the control device for the same that realize more stable autonomous movement by determining the precision and reliability of the autonomous movement map during the autonomous movement, and controlling the behavior such as a speed in response to a result thereof.

DESCRIPTION OF EMBODIMENTS

Hereinafter, embodiments of the invention will be described with reference to the drawings.

First Embodiment

A moving body and a moving body control device according to a first embodiment of the present invention will be described with reference to FIGS. 1 to 10B. Incidentally, an example in which the moving body is a vehicle will be described hereinafter, but other types of moving bodies such as a robot may be used.

Figure 1:
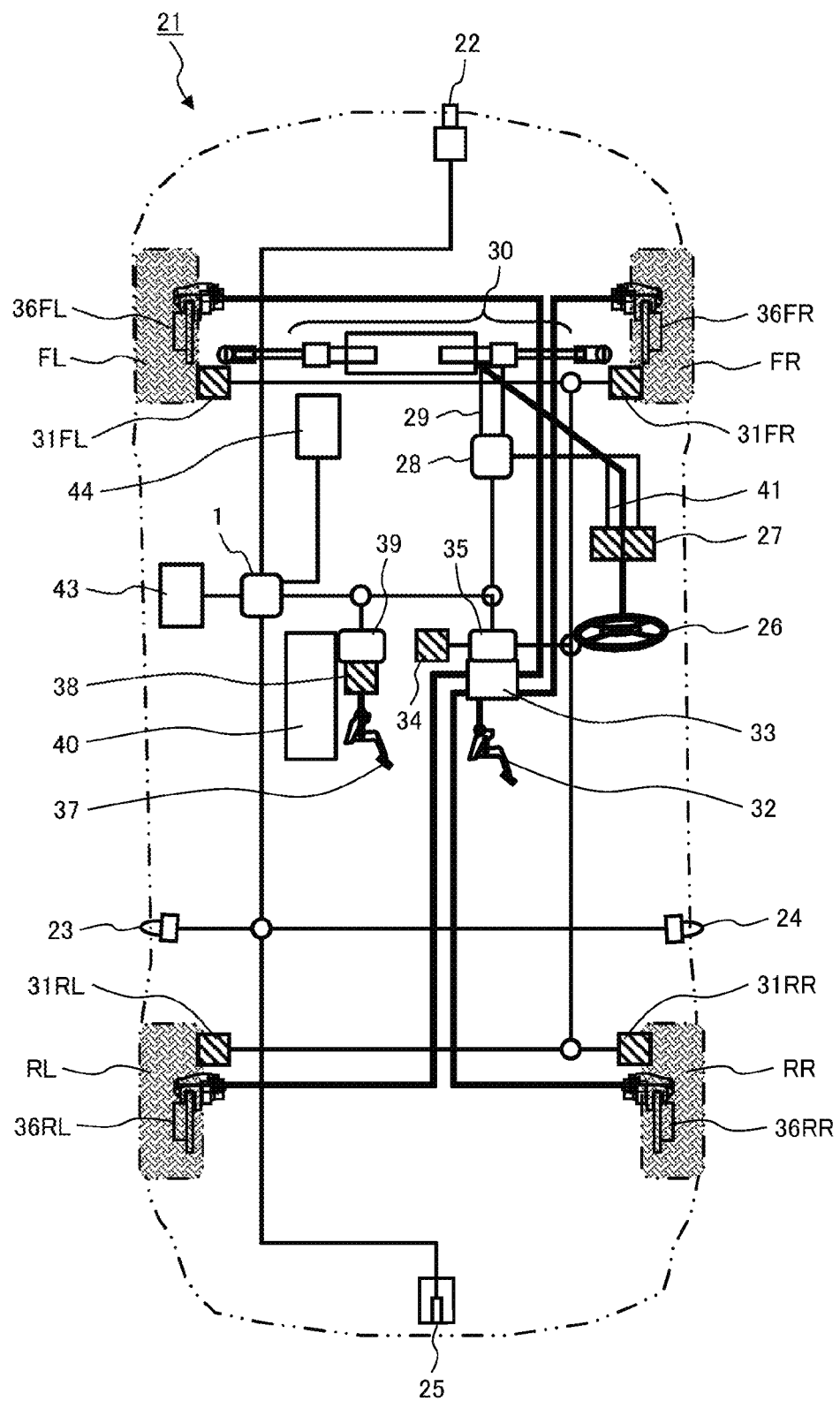
FIG. 1 is an overall configuration diagram of a vehicle equipped with a moving body control device according to a first embodiment.

FIG. 1 is an overall configuration diagram of a host vehicle 21 equipped with a moving body control device (hereinafter, referred to as a "main control device 1") of the present embodiment as viewed from above, and FL, FR, RL, and RR indicate a front left wheel, a front right wheel, a rear left wheel, and a rear right wheel, respectively.

In-vehicle sensors 22 to 25 that recognize an external environment are installed on the front, rear, left, and right of the host vehicle 21. These in-vehicle sensors 22 to 25 are, for example, fish-eye cameras having a 180° viewing angle. When these in-vehicle sensors 22 to 25 are installed on the front, rear, left, and right of the host vehicle 21, it is possible to detect a relative distance and a relative speed with respect to other vehicles, bicycles, pedestrians, obstacles, and the like existing around the host vehicle 21. Although an example in which each sensor is the fisheye camera will be described hereinafter, the sensor may be replaced with an ultrasonic sensor, a stereo camera, or an infrared camera, or a laser radar capable of sensing 360° around the vehicle may be mounted on the ceiling of the host vehicle 21 to replace the front, rear, left, and right sensors. Incidentally, it is essential to reduce cost of an automatic driving system in order to spread automatic driving, and thus, it is considered that a sensor with slightly lower detection precision needs to be employed due to restrictions in terms of cost whichever sensor is used. In consideration of such circumstances, a description will be given hereinafter on an assumption that detection precision of the in-vehicle sensors 22 to 25 is low so that it is difficult to precisely detect an object around the host vehicle 21 in some cases.

The main control device 1 receives inputs of sensor signals from the in-vehicle sensors 22 to 25 and the like, and outputs a command signal to a steering control device 28, a brake control device 35, a drive control device 39, an in-vehicle communication device 43, and a display device 44. Incidentally, the main control device 1 includes a CPU that executes arithmetic processing, a ROM that stores a flow of vehicle travel control, a RAM that temporarily stores data, and an input/output unit that serves to input and output a signal although not illustrated, and calculates the command signal to control travel of the host vehicle 21 according to a generated travel plan by causing the above units to cooperate with each other. Although each of the steering control device 28, the brake control device 35, the drive control device 39, and the steering control device 28 also includes a CPU, a ROM, a RAM, an input/output unit, and the like similarly to the main control device 1, a description regarding known-techniques relating to the cooperation thereof will be omitted.

Here, the steering control device 28 controls a steering control mechanism 30 based on a command signal of the main control device 1, and controls an advancing direction of the host vehicle 21. The brake control device 35 controls a brake control mechanism 33 based on a command signal from the main control device 1, and adjusts a braking force distribution of each wheel. The drive control device 39 controls a drive control mechanism 40 based on a command signal from the main control device 1, and adjusts a torque output of a drive actuator such as an engine and a motor. The in-vehicle communication device 43 performs road-to-vehicle or vehicle-to-vehicle communication. Instead, a configuration in which necessary information is acquired from a recording/reproducing device on a storage medium (a USB memory, an SD card, an HDD, or the like) may be adopted. The display device 44 displays the travel plan of the host vehicle 21 and the like, and it is desirable to use a touch panel display or the like so as to be directly operable by a driver.

Incidentally, the host vehicle 21 including input devices operated by a driver, such as a steering wheel 26, an accelerator pedal 37, and a brake pedal 32, is exemplified hereinafter, but a vehicle in which these input devices are not installed may be used. In this case, the vehicle is a completely autonomous mobile vehicle that does not require driver's operation, or a remotely driven vehicle that travels in response to a travel command from a remote location.

<Brake Operation>

Next, a brake operation of the host vehicle 21 will be described. In a state where the driver is driving the host vehicle 21, a pedal force of the driver stepping on the brake pedal 32 is boosted with a brake booster (not illustrated) if necessary, and a master cylinder (not illustrated) generates a hydraulic pressure in response to the force. The generated hydraulic pressure is supplied via the brake control mechanism 33 to wheel cylinders 36FL, 36FR, 36RL, and 36RR provided on the respective wheels. These wheel cylinders are constituted by a cylinder, a piston, a pad, a disc rotor, and the like (not illustrated), and the piston is propelled by hydraulic fluid supplied from the master cylinder, and the pad connected to the piston is pressed by the disc rotor. Incidentally, the disc rotor rotates with the wheels. Thus, brake torque acting on the disc rotor becomes a braking force acting between the wheels and a road surface. As above, the braking force can be generated on each wheel in response to the driver's operation on the brake pedal. Incidentally, it is not always necessary to mount the brake booster or the master cylinder on the host vehicle 21 of the present embodiment, and a mechanism in which the brake pedal 32 and brake control mechanism 33 are directly connected such that the brake control mechanism 33 is directly operated when the driver steps on the brake pedal 32 may be used.

The brake control device 35 receives inputs of sensor signals from a combined sensor 34 capable of detecting, for example, a longitudinal acceleration, a lateral acceleration, a yaw rate, and a yaw angle, wheel speed sensors 31FL, 31FR, 31RL, and 31RR installed on the respective wheels, and a steering wheel angle detector 41 via the steering control device 28, a braking force command signal from the main control device 1, and the like.

Further, a command signal output from the brake control device 35 is input to the brake control mechanism 33 including a pump, a control valve, and the like to generate an arbitrary braking force for each wheel independently of the driver's operation on the brake pedal. In this manner, the main control device 1 can generate the arbitrary braking force in the host vehicle 21 by outputting the braking force command signal to the brake control device 35 and serves a role of automatically performing braking during autonomous movement in which no driver's operation occurs. However, the present embodiment is not limited to the brake control device 35 having the above configuration, and other actuators such as a brake-by-wire may be used.

<Steering Operation>

Next, a steering operation of the host vehicle 21 will be described. In a state where the driver is driving the host vehicle 21, steering torque and a steering wheel angle input by the driver via the steering wheel 26 are detected by a steering torque detector 27 and the steering wheel angle detector 41, respectively, and the steering control device 28 controls a motor 29 to generate assist torque based on these pieces of information.

Then, a resultant force of the steering torque of the driver and the assist torque generated by the motor 29 moves the steering control mechanism 30 so that a direction of the front wheels (FL and FR wheels) varies. On the other hand, it is configured such that a reaction force from a road surface is transmitted to the steering control mechanism 30 in response to a turning angle of the front wheels, and is transmitted to the driver as a road surface reaction force. Incidentally, the steering torque detector 27 may be omitted, and a (so-called heavy steering) mechanism that does not generate any assist torque when the driver operates the steering wheel 26 may be used.

Further, the steering control device 28 can control the steering control mechanism 30 by generating torque using the motor 29 independently of the steering operation of the driver. Therefore, the main control device 1 can control the front wheels to have an arbitrary turning angle by communicating a steering torque command (value) to the steering control device 28, and serves a role of automatically performing steering during the autonomous movement in which no driver's operation occurs. However, the present embodiment is not limited to the steering control device having the above configuration, and other actuators such as a steer-by-wire may be used.

<Accelerator Operation>

Next, an accelerator operation of the host vehicle 21 will be described. The amount of the accelerator pedal 37 depressed by the driver is detected by a stroke sensor 38 and is input to the drive control device 39. The drive control device 39 adjusts a throttle opening degree in response to the depression amount of the accelerator pedal 37, for example, to control the engine. As a result, the host vehicle 21 can be accelerated in response to the driver's operation on the accelerator pedal. Further, the drive control device 39 can control the throttle opening degree independently of the driver's operation on the accelerator. Therefore, the main control device 1 can generate an arbitrary acceleration in the host vehicle 21 by communicating an acceleration command (value) to the drive control device 39, and serves a role of automatically performing acceleration during the autonomous movement where no driver's operation occurs.

Incidentally, the host vehicle is not necessarily an engine vehicle, and the main drive device may be an electric motor. In this case, the drive control device 39 calculates a motor torque command signal in response to the depression amount of the accelerator pedal 37, and performs current control such that a power converter (not illustrated) realizes the motor torque command signal.

<Configuration of Moving Body Control Device>

Figure 2:
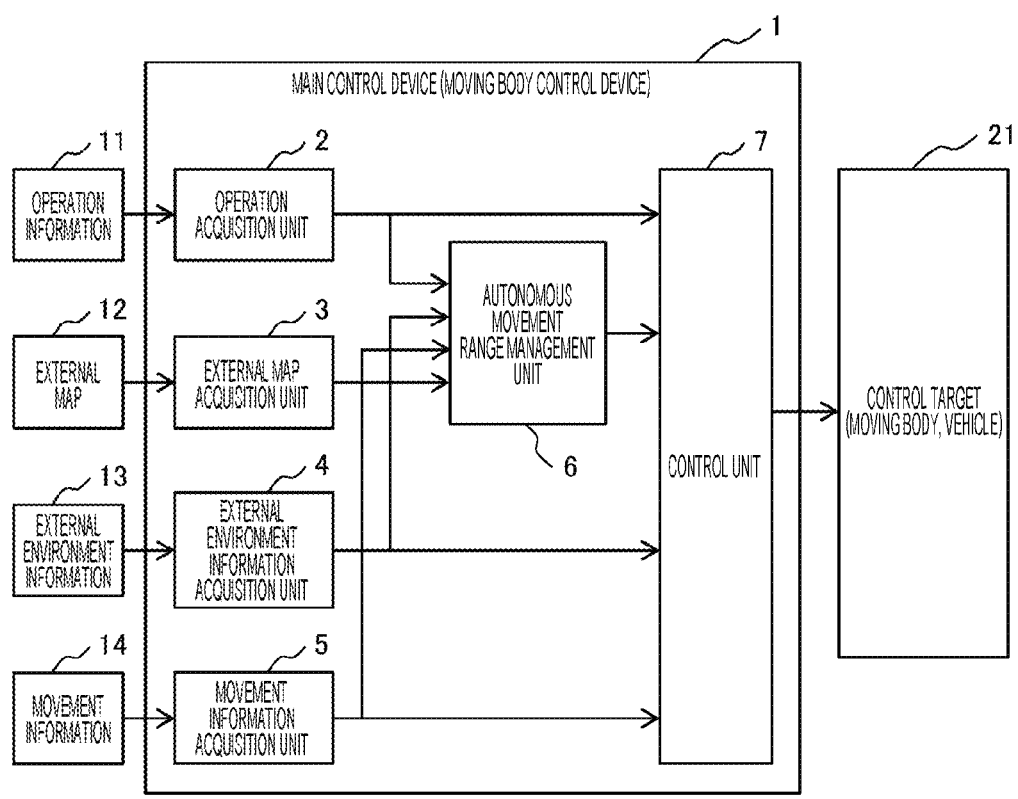
FIG. 2 is a block diagram illustrating a configuration of the moving body control device according to the first embodiment.

FIG. 2 is a block diagram illustrating a part of the main control device 1 (moving body control device) according to the present embodiment. As illustrated here, the main control device 1 includes an operation acquisition unit 2, an external map acquisition unit 3, an external environment information acquisition unit 4, a movement information acquisition unit 5, an autonomous movement range management unit 6, and a control unit 7.

The operation acquisition unit 2 acquires operation information 11 of the driver and stores the acquired operation information 11 in a storage device (not illustrated) of the main control device 1. Specific examples of the operation information 11 include the steering torque and the steering wheel angle of the steering wheel 26, the depression amount of the accelerator pedal 37, a depression force of the brake pedal 32, and the like. Further, when the display device 44, a push button, a switch, and the like are provided as input devices, inputs is from these devices are the operation information 11.

The external map acquisition unit 3 acquires an external map 12 corresponding to a peripheral region of the host vehicle 21 and a planned movement region from the outside of the main control device 1. This external map 12 includes information such as information on a route and a lane as movement targets, information related to a traffic rule such as a road sign and a stop line, and static landmark information (for example, a paint such as a white line on a road surface, an object around a road such as a building) used for self-position estimation. Specific examples of the external maps 12 include a map for navigation sold for car navigation systems, a map that can be obtained from the Internet (Google (registered trademark) map, Open Street Map (registered trademark), and the like), a map automatically generated from an aerial image, a map created by handwriting input, and the like. Incidentally, the external map 12 that is available for free or at low cost is not guaranteed in quality or precision, and does not always include sufficient information necessary for autonomous movement.

The external environment information acquisition unit 4 acquires external environment information 13 from the in-vehicle sensors 22 to 25 installed on the front, rear, left, and right of the host vehicle 21, and obtains a position, a size, a movement speed, and the like of an object (such as an obstacle) around the host vehicle 21 based on the acquired external environment information 13. Further, when a road sign, a road surface paint, a traffic light, or the like is detected, a position and a type thereof are obtained. When cameras are used as these in-vehicle sensors, the external environment information 13 can be acquired by identifying types of a plurality of objects at the same time based on image data of the cameras. In particular, a stereo camera using two cameras is advantageous since it is also possible to detect a relative distance and a relative speed of a moving body or an obstacle. The obtained external environment information 13 is stored in a storage device (RAM or the like) in a travel control device.

The movement information acquisition unit 5 acquires movement information 14 such as a current position and an advancing angle of the host vehicle 21 or an operation state quantity. The current position of the host vehicle 21 can be specified by, for example, a GPS system, and the advancing angle can be acquired based on position information over time if the host vehicle 21 is moving. Further, if two GPS receivers are attached on the front and rear of the host vehicle 21, the advancing angle can be acquired even when the host vehicle 21 is stopped. On the other hand, the operation state quantity is the speed of each wheel detected by the wheel speed sensor 31, the longitudinal acceleration, the lateral acceleration, the yaw rate, the yaw angle, and the like acquired by the combined sensor 34.

The autonomous movement range management unit 6 generates an autonomous movement map 8 in which an autonomously movable range of the host vehicle 21 has been registered based on the operation information 11, the external environment information 13, and the movement information 14 described above, and determines whether autonomous movement is possible in each region within the autonomous movement map 8. The autonomous movement map 8 is a map in which a road shape, a travel route, a traffic regulation, a landmark, and the like are registered for each region, and is used during autonomous movement of the host vehicle 21. For example, if the autonomously moving host vehicle 21 is desired to turn right at an intersection, the right turn can be appropriately made by referring a shape of the intersection, a travel route at the time of turning right, information on a traffic regulation, and the like which are included in the autonomous movement map 8. Examples of intersection information or road information recorded in the autonomous movement map 8 include the number of lanes of a road at an intersection, a road width, an intersection angle of the road, a lane width, a median width, a crosswalk width, the amount of setback of a crosswalk from an intersection, presence or absence of a traffic light, and the like. Alternatively, if the external environment information 13 can obtain positions of objects around the host vehicle 21 as point groups, information obtained by integrating the point groups may be used as the autonomous movement map 8. Incidentally, the autonomous movement range management unit 6 records the generated autonomous movement map 8 in the storage device provided in the main control device 1.

The autonomous movement range management unit 6 acquires a current position and an advancing angle of the host vehicle 21 from the movement information 14 in a region in which the host vehicle 21 travels for the first time, and extracts positions of an obstacle, a landmark, a white line on a road surface, and the like near the host vehicle 21 from the external environment information 13. Then, each absolute coordinate of the obstacle and the like with the ground as the reference are obtained based on these pieces of information. Then, the external environment information 13 converted into the coordinates is registered in the autonomous movement map 8 as information related to the region. Thereafter, in the case of traveling the same region again, a current position and the advancing angle of the host vehicle 21, a current position and an advancing angle of the host vehicle 21 are estimated based on the autonomous movement map 8 reflecting the external environment information 13 detected during the previous travel, and the autonomous movement map 8 is updated if there is newly detected external environment information 13. As a result, reliability of the autonomous movement map 8 improves as the number of times of travel in the same region increases.

Examples of a method of estimating the current position and the advancing angle include a method of acquiring image data in the periphery of the host vehicle 21 by the in-vehicle sensor and collating position information with a stored external environment image to specify a position of the host vehicle 21. Alternatively, there is a method of recognizing a specific landmark using an image or the like and specifying a position of the host vehicle 21 based on relative position information of the landmark and the host vehicle 21 and absolute position information of the landmark.

<Operation of Autonomous Movement Range Management Unit 6>

Next, an example of an operation of the autonomous movement range management unit 6 will be described with reference to FIGS. 3A to 5.

Figure 3A:
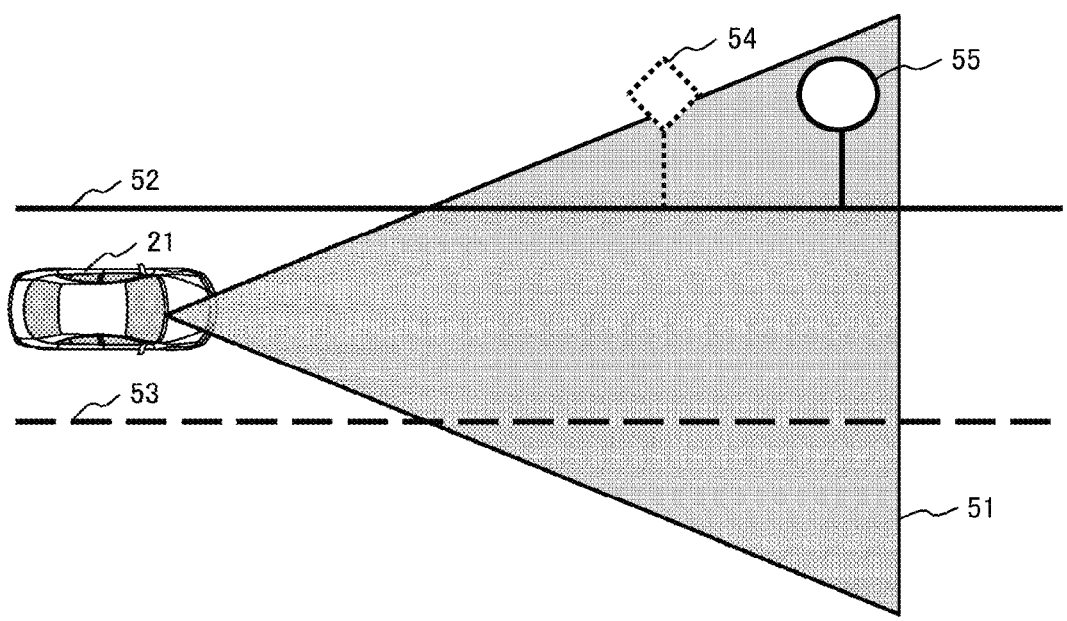
FIG. 3A is an explanatory view illustrating an example of acquiring first external environment information by an autonomous movement range management unit 6 according to the first embodiment.

FIG. 3A is an example illustrating a relationship between a detection range 51 of the front in-vehicle sensor 22 and the acquired external environment information 13 in a place (region) where the host vehicle 21 travels for the first time. Here, illustrated is a situation where a lane edge in a solid line (a white line 52), a dashed center line (white line 53), and a road sign 55 in a solid line are detected, but a road sign 54 in a dotted line has not been detected for some reason (deficiency in detection algorithm, insufficient performance of the in-vehicle sensor 22, or the like). Incidentally, the external environment information 13 is detected using only the in-vehicle sensor 22 in this example, but the external environment information 13 may be detected by integrating information obtained from the in-vehicle sensors 22 to 25.

Figure 3B:
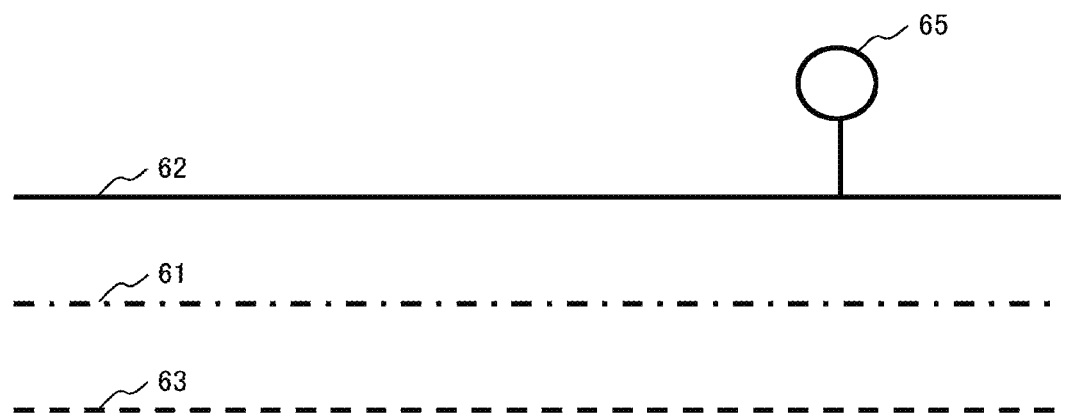
FIG. 3B is an explanatory view illustrating an example of creating first autonomous movement map by the autonomous movement range management unit 6 according to the first embodiment.

When acquiring the external environment information 13 in FIG. 3A, the autonomous movement range management unit 6 generates the autonomous movement map 8 illustrated in FIG. 3B. That is, a white line 62, a white line 63, a road sign 65, and a travel route 61 on which the host vehicle 21 has traveled are stored as the autonomous movement map 8 for the corresponding region.

Next, an example of the external environment information 13 obtained when the host vehicle 21 has traveled the same place as in FIG. 3A for the second time and an outline of a method of correcting the current position of the host vehicle 21 will be described with reference to FIG. 4A.

Figure 4A:
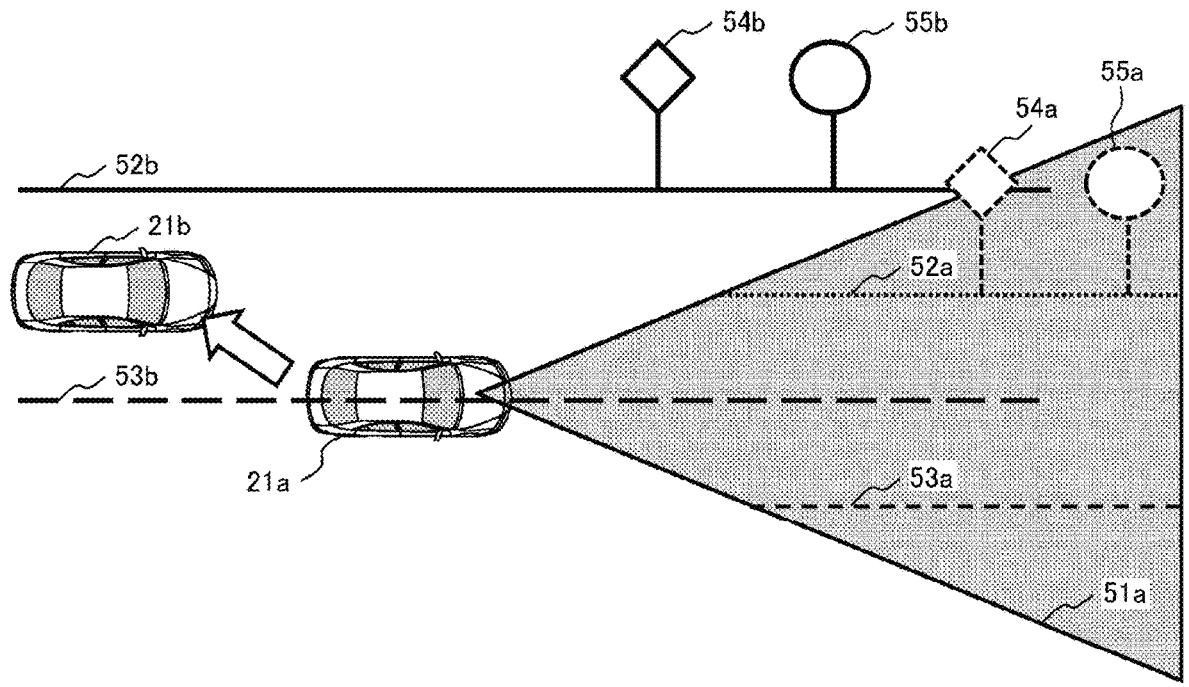
FIG. 4A is an explanatory view illustrating an example of acquiring second external environment information by an autonomous movement range management unit 6 according to the first embodiment.

FIG. 4A illustrates that a white line 52a, a white line 53a, a road sign 54a, and a road sign 55a are detected from a detection range 51a during the second travel. In other words, it is illustrated that the road sign 54a which could not be detected during the first travel has been detected during the second travel.

Here, if there is an error in the movement information 14 such as a GPS signal acquired during the second travel, a host vehicle position 21a output by the movement information acquisition unit 5 is a position shifted from an actual host vehicle position 21b. Therefore, landmark matching is performed by referring to positions of each white line and each road sign in the autonomous movement map 8 created at the time of the first travel, thereby correcting the current position of the host vehicle 21 to the original host vehicle position 21b. Further, the positions of the detected white lines and road signs are corrected to 52b to 55b, respectively, based on the correction result.

Figure 4B:
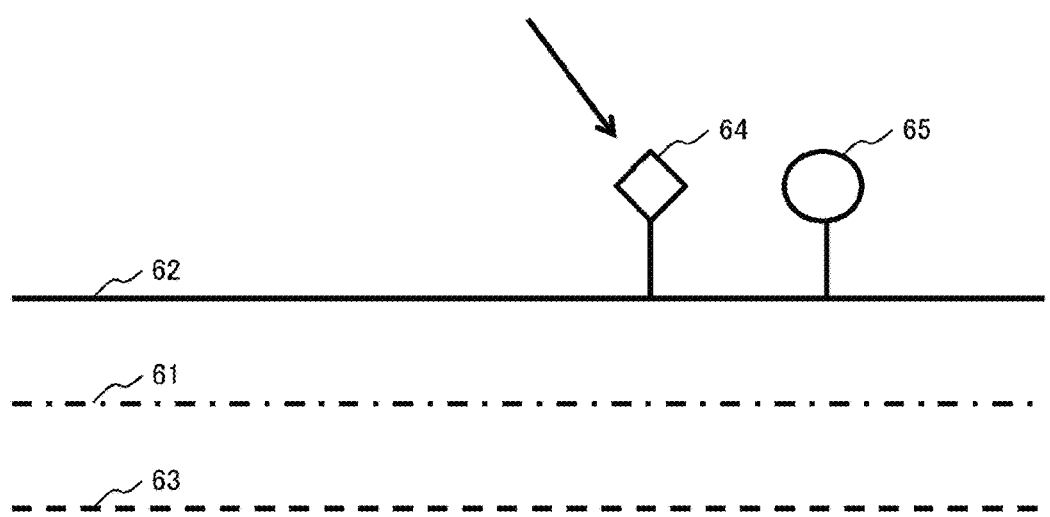
FIG. 4B is an explanatory view illustrating an example of creating a second autonomous movement map by the autonomous movement range management unit 6 according to the first embodiment.

FIG. 4B illustrates an example of the autonomous movement map 8 updated based on the above correction processing. As illustrated here, a road sign 64 that has been missed in the autonomous movement map 8 (FIG. 3B) generated during the previous travel is added.

In this manner, the autonomous movement range management unit 6 uses the external environment information 13 and the movement information 14 acquired during the initial travel in a certain region to generate the autonomous movement map 8 for the corresponding region. Then, when traveling again in the region, the newly detected external environment information 13 is integrated while correcting the current position of the host vehicle 21 by collating the information of the existing autonomous movement map 8 with the external environment information 13, so that the reliability of the autonomous movement map 8 in the corresponding region can be improved.

Next, an operation example of the autonomous movement range management unit 6 at the time of determining whether the host vehicle 21 can autonomously move in each region registered in the autonomous movement map 8 will be described with reference to FIG. 5.

Figure 5A:
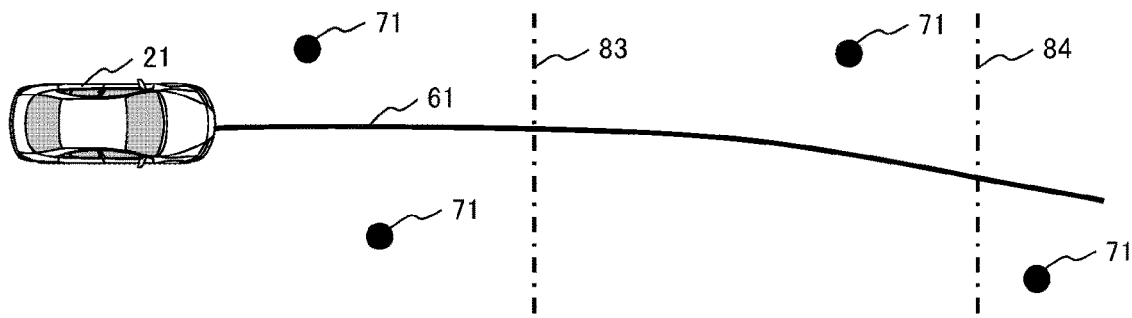
FIGS. 5A-5C are an explanatory view illustrating an operation example of the autonomous movement range management unit 6 according to the first embodiment.

FIG. 5A is an example of the external environment information 13 obtained via the in-vehicle sensors 22 to 25 in a place where the host vehicle 21 travels by manual, and illustrates a plurality of objects 71 detected during travel along a travel route 61. In this case, each of the objects 71 and the travel route 61 are registered in the autonomous movement map 8.

Figure 5B:
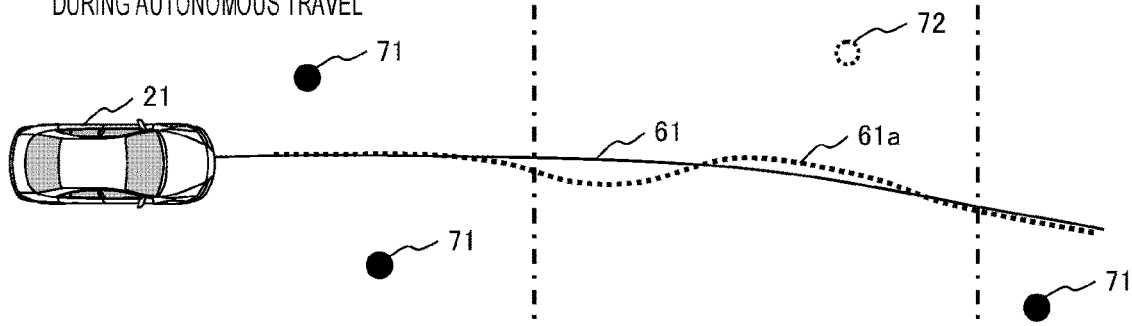

FIG. 5B illustrates a behavior of the vehicle when autonomous movement has been tried in the same region as in FIG. 5A based on the autonomous movement map 8. Such test travel of autonomous movement indicates a situation where the object 72 indicated by a dotted line among the plurality of objects 71 has not been detected for some reason. In a region between one-dot chain lines 83 and 84, there is a point where the host vehicle that is autonomously moving staggers in the left-right direction and deviates from the travel route 61 registered in the autonomous movement map 8 as in a travel route 61a in a dotted line due to the failure in detection of the object 72.

An example of a method of determining possibility of autonomous movement using such a "stagger" is a method of using the movement information 14 (a steering angle, a longitudinal acceleration, a lateral acceleration, a yaw rate, a yaw angle, and the like) acquired during the manual travel. For example, there is a method of storing the movement information 14 during manual travel in the autonomous movement map 8 and determining a region in which a deviation of the movement information 14 during autonomous movement illustrated in FIG. 5B is equal to or larger than a predetermined value as "autonomously immovable".

Alternatively, an average and a variance in a certain time interval may be calculated for the movement information 14 obtained in FIG. 5B, and a region in which a variance value of at least one type of movement information 14 is equal to or larger than a predetermined value may be determined as "autonomously immovable". As a criterion for the determination on the possibility of the autonomous movement, the movement information 14 obtained in driving by a skilled driver with a small stagger may be used, or a form in which a driver selects a value of "allowing this degree of stagger" in advance may be used.

Figure 5C:
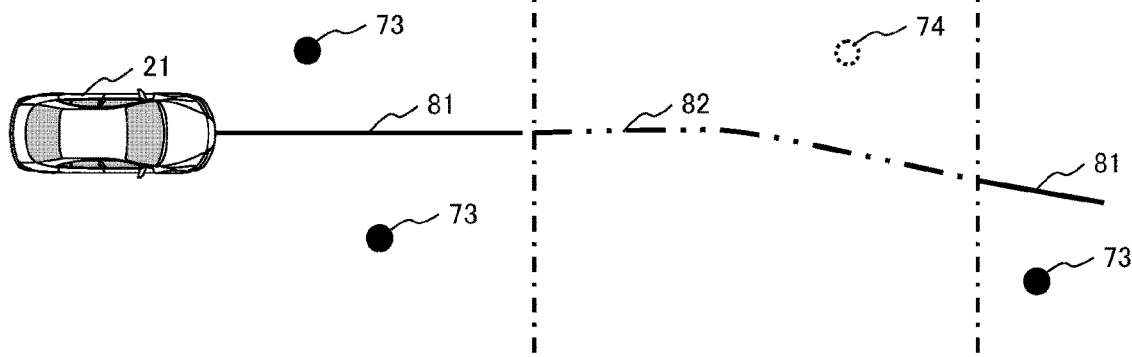

FIG. 5C is an example in which the possibility of autonomous movement for each region is registered in the autonomous movement map 8 based on a result of the test travel of autonomous movement in FIG. 5B. In FIG. 5C, a solid line 81 in a region before the one-dot chain line 83 and in a region after the one-dot chain line 84 indicates a travel route where autonomous movement is possible without "stagger", and a two-dot chain line 82 in a region between the two one-dot chain lines indicates a travel route where autonomous movement is not possible due to the occurrence of "stagger". At this time, the objects 71 that have been detected in FIG. 5B are registered as landmarks 73 in the autonomous movement map 8 in FIG. 5C, but the object 72 that has not been detected is not registered as a landmark. This is because the likelihood that the object 72 is removed after the previous travel and before the current travel is also conceivable.

Incidentally, an element other than "stagger" may be used as a method of determining the possibility of autonomous movement in FIG. 5B. For example, in the example of FIG. 5, there are a travel time (FIG. 5A) in which the object 72 has been detected and a travel time (FIG. 5B) in which the object 72 has not been detected. In this case, the autonomous movement map 8 may be registered by adding information (a flag, an existence probability value, and the like) indicating "uncertain" as in a landmark 74 indicated by a dotted line. In this case, a region in which many "uncertain" objects are registered can be determined as "autonomously immovable".

Further, in the autonomous movement range management unit 6, the possibility of autonomous movement may be determined by comparing the external map 12 acquired by the external map acquisition unit 3 with the autonomous movement map 8. Although details of a method for this comparison will be described below, a distance deviation between a target movement route of the host vehicle 21 and a travel route in the external map 12, an average value per unit distance, a cumulative value of the deviation, and the like are used if briefly described. Then, a comparison result obtained using a certain method is transmitted to the control unit 7.

<Operation of Control Unit 7>

In the case of autonomous movement in an autonomously movable region registered in the autonomous movement map 8, the control unit 7 calculates and generates a travel plan using at least one of the autonomous movement map 8, the operation information 11, the external environment information 13, and the movement information 14, and determines an operation of the host vehicle 21 during the autonomous movement based on this travel plan. Then, a control command signal of each actuator mounted on the host vehicle 21 is calculated so as to realize the determined operation. When configured to directly control the actuators, the main control device 1 calculates physical quantities for operating the respective actuators. For example, in an automatic inter-vehicle distance control system, an acceleration command signal of a vehicle is calculated in accordance with setting of a distance with respect to a preceding vehicle and setting of the maximum speed, and the like, and an engine throttle and a brake pressure are controlled to realize the acceleration command signal.

The travel plan generated by the control unit 7 of the present embodiment is a planned travel route of the host vehicle 21 to a set destination, a speed at each point in the route, and the like, and a steering angle command signal and the vehicle acceleration command signal for satisfying the travel plan are calculated.

Further, the control unit 7 changes the vehicle behavior during the travel plan based on the comparison result between the external map 12 and the autonomous movement map 8 calculated by the autonomous movement range management unit 6. For example, the reliability of the autonomous movement map 8 is considered to be low in a region in which the deviation between the external map 12 and the autonomous movement map 8 is large, and the speed of the host vehicle 21 is reduced to autonomously move.

Next, a method of evaluating the reliability of the autonomous movement map 8 performed by the control unit 7 will be specifically described with reference to FIGS. 6 to 10B. Each drawing is an example in which a deviation between the external map 12 and the autonomous movement map 8 is calculated based on different criteria, and also indicates speed control of the host vehicle 21 in response to the degree of the deviation. Incidentally, it is unnecessary to make all these determinations in parallel, and it is sufficient to calculate a deviation at least using one thereof and control the behavior such as speed according to a place or by driver's selection.

<First Deviation Calculation Method>

Figure 6A:
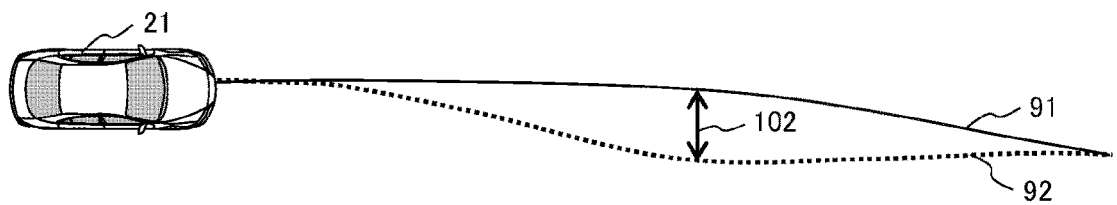
FIGS. 6A-C are an explanatory view illustrating an operation example of a control unit 7 according to the first embodiment.
Figure 6B:
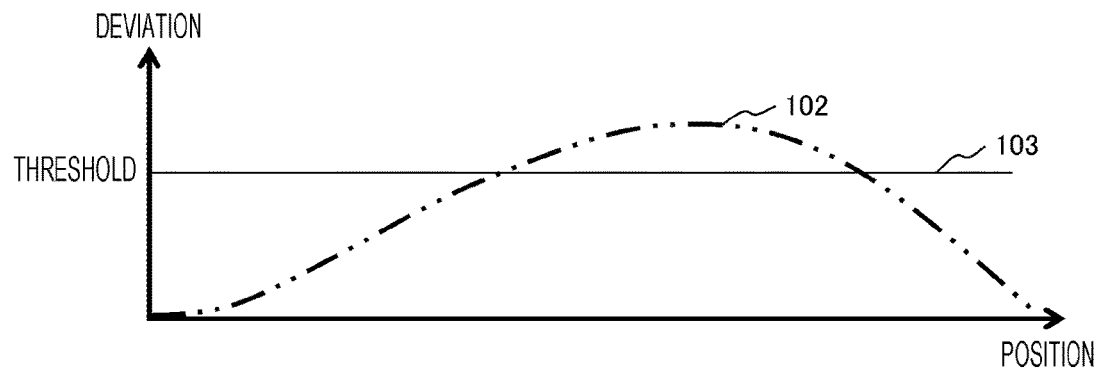

FIG. 6 is a view for describing a first deviation calculation method, and illustrates an example in which attention is paid to a deviation of a target movement route of the host vehicle 21. In FIG. 6A, a target movement route 91 acquired from the external map 12 is indicated by a solid line, and a target movement route 92 acquired from the autonomous movement map 8 is indicated by a dotted line. As illustrated here, when a distance in the lateral direction (direction perpendicular to the advancing direction of the host vehicle 21) between both the target movement routes is set as a deviation 102, a temporal change of the deviation 102 behaves as indicated by a two-dot chain line in FIG. 6B. Then, when the deviation 102 exceeds a preset threshold 103, the control unit 7 changes the behavior of the host vehicle 21 to safer control.

Figure 6C:
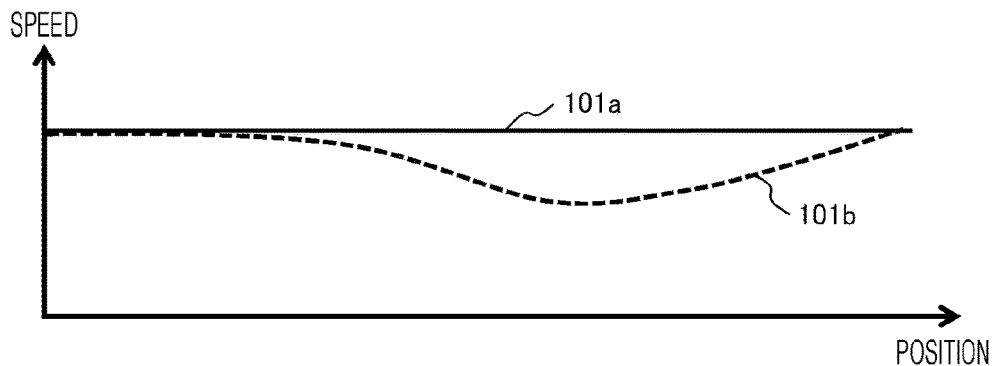

For example, as illustrated in FIG. 6C, an initial set speed 101*a* according to an initial travel plan is changed to a suppressed speed 101*b* indicated by a broken line regarding a section including a region in which the deviation 102 exceeds the threshold 103. This is because the likelihood that reliability of the autonomous movement map 8 is low is conceivable in the region in which the deviation 102 exceeds the threshold 103, and thus, the likelihood that there is a danger if the vehicle travels along the target movement route 92 with the relatively high initial set speed 101*a* is also conceivable. Incidentally, the likelihood that the autonomous movement map 8 is correct and the external map 12 is incorrect is also conceivable, but there is no danger even if the vehicle travels at low speed along the correct target movement route 92. Thus, the movement speed of the host vehicle 21 is controlled in consideration of only the magnitude of the deviation 102 of the target movement route in the present embodiment.

As the above determination is performed in the control unit 7, a region in which the reliability is likely to be low can be specified by the comparison with the external map even if the reliability of the autonomous movement map 8 created using the in-vehicle sensor is unknown, and safety during travel in the region can be improved by the change to a travel plan with the suppressed speed during the travel in the region.

<Second Deviation Calculation Method>

Figure 7A:
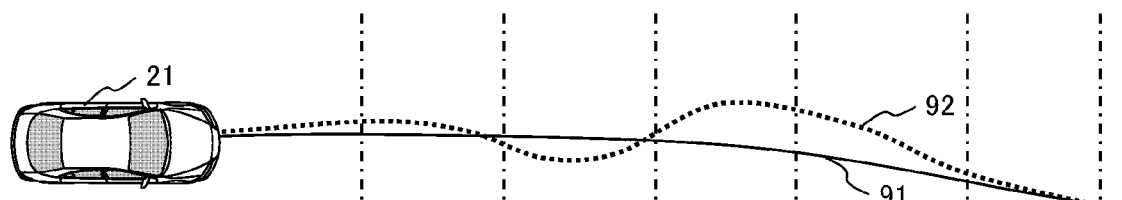
FIGS. 7A-C are an explanatory view illustrating an operation example of the control unit 7 according to the first embodiment.
Figure 7B:
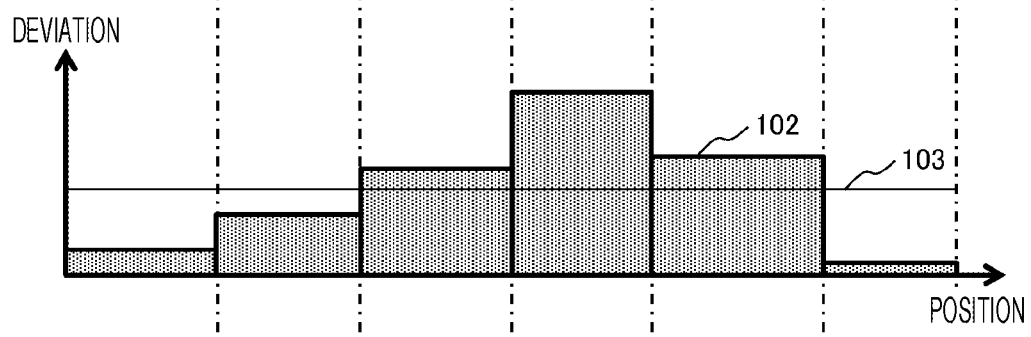

FIG. 7 is a view for describing a second deviation calculation method, and illustrates another example in which attention is paid to a deviation of a target movement route of the host vehicle 21. Incidentally, redundant descriptions for common points with FIG. 6 are omitted. Although the deviations 102 of the target movement route are sequentially calculated and compared with the threshold 103 in FIG. 6 described above, an average value for each fixed section is defined as the deviation 102 in FIG. 7. When target movement routes of the external map 12 and the autonomous movement map 8 are set as illustrated in FIG. 7A, the deviation 102 obtained as the average value for each fixed section changes as illustrated in FIG. 7B.

Figure 7C:
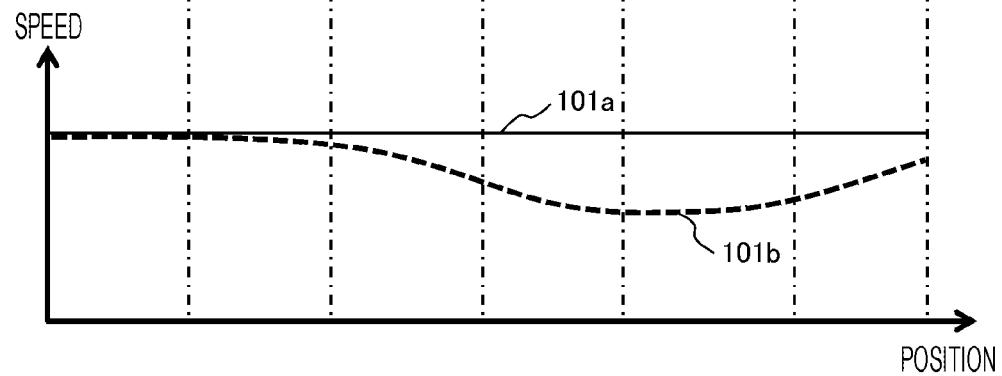

Even in the case of using this deviation calculation method, the control unit 7 changes the initial set speed 101*a* of the initial travel plan to the suppressed speed 101*b* in a region in which the deviation 102 exceeds the threshold 103 as illustrated in FIG. 7C. In FIG. 7 using the average value of the lateral distances between both the target movement routes, a temporal change of the deviation 102 is smoother than that in FIG. 6. Thus, even if the lateral distance between both the target movement routes locally increases due to influence of noise from the in-vehicle sensor or the like, the influence of noise can be removed, and the speed change tends to be smooth.

<Third Deviation Calculation Method>

Figure 8A:
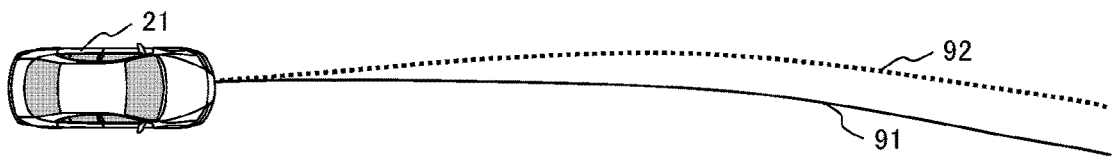
FIGS. 8A-C are an explanatory view illustrating an operation example of the control unit 7 according to the first embodiment.
Figure 8B:
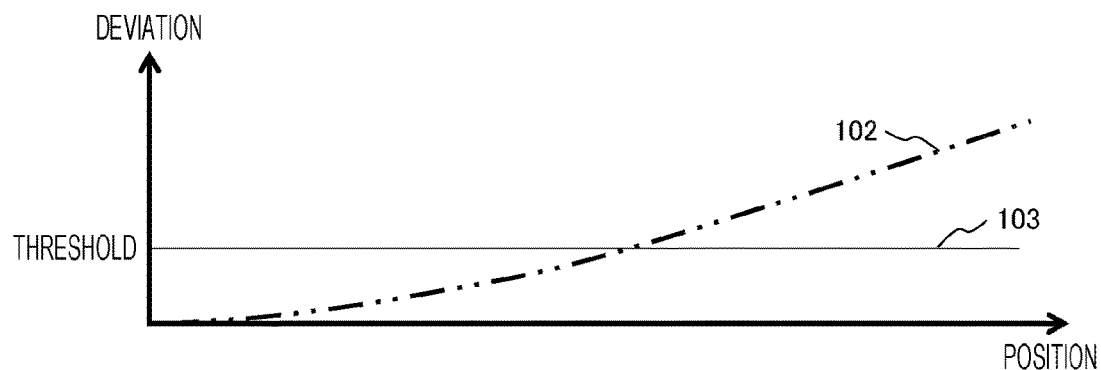

FIG. 8 is a view for describing a third deviation calculation method, and illustrates another example in which attention is paid to a deviation of a target movement route of the host vehicle 21. Incidentally, redundant descriptions for common points with the above-described deviation calculation methods are omitted. Although the deviation 102 of the target movement route is calculated sequentially or for each fixed section and compared with the threshold 103 in FIGS. 6 and 7 described above, a cumulative value (an integral value or an area) of a lateral distance between two target movement routes is defined as the deviation 102 in FIG. 8. When the target movement routes of the external map 12 and the autonomous movement map 8 are as illustrated in FIG. 8A, the deviation 102 gradually increases as illustrated in FIG. 8B.

Figure 8C:
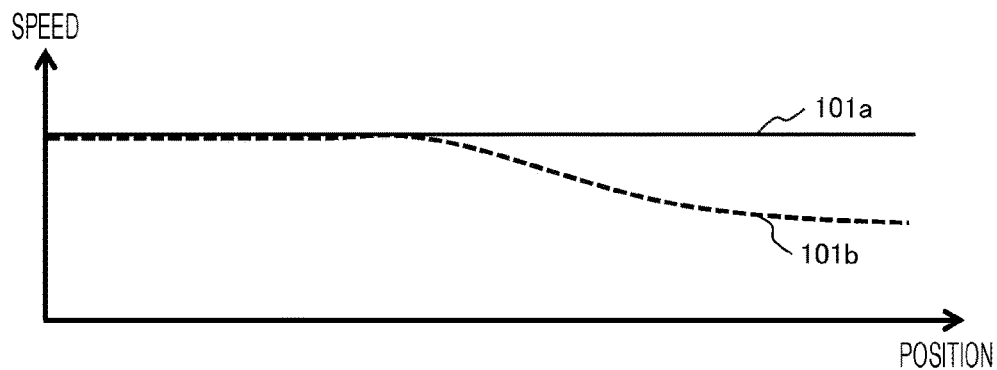

Even in the case of using this deviation calculation method, the control unit 7 changes the initial set speed 101*a* of the initial travel plan to the suppressed speed 101*b* in a region in which the deviation 102 exceeds the threshold 103 as illustrated in FIG. 8C. In FIG. 8, a temporal change of the deviation 102 becomes smoother than those in FIGS. 6 and 7, and thus, the speed change in consideration of the magnitude of the deviation 102 tends to be smoother. Further, the cumulative value remains even after the lateral distance between the target movement routes 91 and 92 decreases, and thus, there is also a feature that safe travel with the reduced speed continues. Incidentally, in the case of using this deviation calculation method, either a configuration in which the cumulative value illustrated in FIG. 8B can be reset to return to the initial set speed 101a every time a predetermined time elapses or a configuration in which the deviation 102 is cumulated only when the lateral distance between the target movement routes 91 and 92 exceeds the predetermined value may be adopted.

<Fourth Deviation Calculation Method>

FIG. 9 is a view for describing a fourth deviation calculation method, and illustrates an example in which comparison is similarly performed from the viewpoint of a target movement route of the host vehicle 21. Although the deviation 102 is calculated by paying attention to the lateral distance between the two target movement routes in FIGS. 6 to 8 described above, curvatures of both target movement routes are calculated, and a difference between the two curvatures is defined as the deviation 102 in FIG. 9.

Figure 9A:
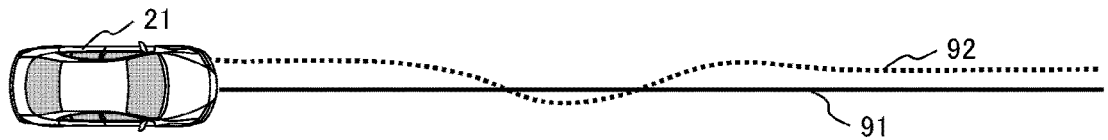
FIGS. 9A-C are an explanatory view illustrating an operation example of the control unit 7 according to the first embodiment.
Figure 9B:
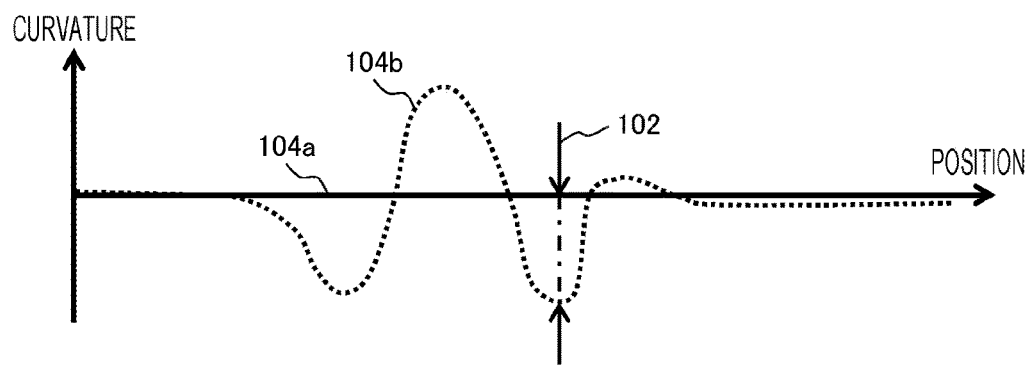
Figure 9C:
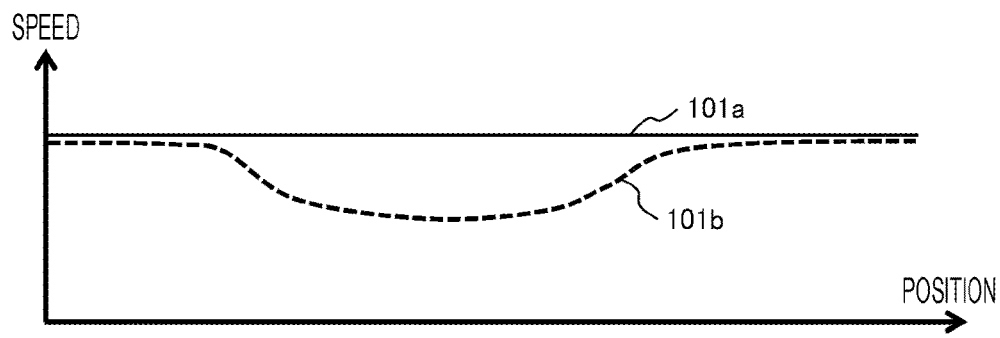

When the target movement route 91 of the external map 12 and the target movement route 92 of the autonomous movement map are set as forms illustrated in FIG. 9A, each change of a curvature 104a of the target movement route 91 and a curvature 104b of the target movement route 92 are given in forms as illustrated in FIG. 9B. That is, a difference between the curvature 104a (curvature=0) and the curvature 104b illustrated in FIG. 9B is set as the deviation 102. In this case, the initial set speed 101a of the initial travel plan is changed to the suppressed speed 101b in a section where an absolute value of the deviation 102 greatly varies as illustrated in FIG. 9C.

In the present deviation calculation method illustrated in FIG. 9, the initial set speed 101a of the initial travel plan is maintained and speed reduction is suppressed when changes of the curvatures coincide and shapes of the routes coincide even if a lateral distance between the target movement routes 91 and 92 is large, which is different from the methods of FIGS. 6 to 8. Conversely, the initial set speed 101a of the initial travel plan is changed to the suppressed speed 101b when a deviation occurs between the changes of the curvatures and the route shapes are different even if the lateral distance between the target movement routes 91 and 92 is small. Incidentally, in practice, the precision and reliability of the target movement route 91 acquired from the external map 12 are not necessarily guaranteed, and the target movement route 91 at the time of autonomously moving in this region in practice is not always a straight line. Similarly, the target movement route 92 generated as the autonomous movement map 8 is not always correct, and it is reasonable to travel at a reduced speed for safety in a region in which the shapes of the both are greatly different.

<Fifth Deviation Calculation Method>

Figure 10A:
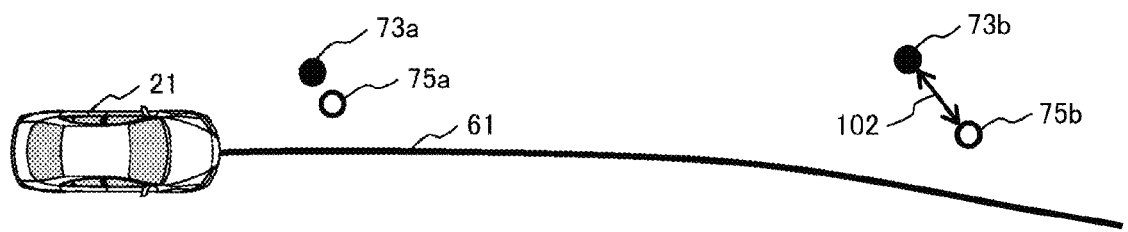
FIG. 10A is an explanatory view illustrating a landmark error between an autonomous movement map and an external map according to the first embodiment.
Figure 10B:
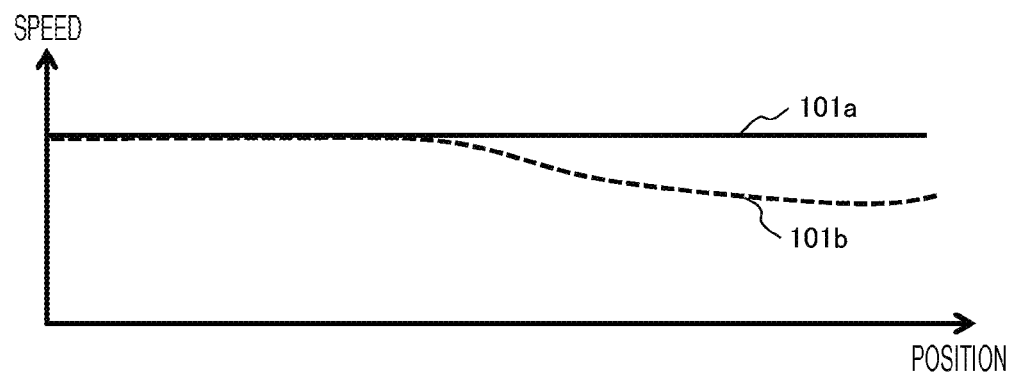
FIG. 10B is an explanatory view illustrating an operation example of the control unit 7 according to the first embodiment.

FIGS. 10A and 10B are views for describing a fifth deviation calculation method, and illustrate an example in which comparison is performed from the viewpoint of a landmark for self-position estimation. Although FIGS. 6 to 9 define the deviation 102 by paying attention to the target movement route of the host vehicle 21, the deviation 102 is defined here by paying attention to an error of a landmark position such as a road sign, a part of a building, and a trunk of a street tree.

The example of FIG. 10A illustrate landmarks 73a and 73b (black circles) registered in the autonomous movement map 8 and landmarks 75a and 75b (white circles) registered in the external map 12, which exist near the travel route 61 of the host vehicle, and each positional error is defined as the deviation 102. Incidentally, the landmark 73a and the landmark 75a represent the same object, and the landmark 73b and the landmark 75b represent the same object.

In FIG. 10A, the landmark 73a and the landmark 75a have a slight positional error, but almost coincide, and the deviation 102 is small. Since the landmark is mainly used for self-position estimation, a risk of a self-position estimation error during autonomous movement is sufficiently small when a position of the landmark satisfies the required precision of self-position estimation (for example, the error is within 0.5 m), and the reliability of the autonomous movement map 8 in the corresponding region can be considered to be high. On the other hand, there is the relatively large deviation 102 between positions of the landmark 73b and the landmark 75b, and it is assumed here that the deviation is larger than the required precision of self-position estimation (for example, the error is within 0.5 m). At this time, it is considered that the risk of the self-position estimation error during autonomous movement is also large, and the reliability of the autonomous movement map 8 in the corresponding region can be considered to be high.

For this reason, the initial set speed 101a in the initial travel plan is maintained as it is in a region near the landmark 73a with the small deviation 102, and the initial set speed 101a of the initial travel plan is changed to the suppressed speed 101b in a region near the landmark 73b with the large deviation 102 as illustrated in FIG. 10B. As a result, even if the self-position estimation precision actually decreases in the region near the landmark 73b where the risk of the self-position estimation error during autonomous movement is considered to be large, the autonomous movement speed can be suppressed, so that a risk of instability of the autonomous movement can be reduced.

In this manner, according to the moving body control device (main control device 1) of the first embodiment, when the autonomous movement range management unit 6 expands the autonomously movable region in the autonomous movement map 8, the reliability of the autonomous movement map 8 in the corresponding region is estimated by referring to the information of the external map 12, and the travel plan of the host vehicle 21 is changed in response to the estimated reliability. Thus, the autonomous movement can be further stabilized at the time of autonomously moving in any region.

Second Embodiment

Next, a second embodiment of the present invention will be described with reference to FIGS. 11 to 15. Incidentally, redundant descriptions for the same parts as those in the first embodiment are omitted.

The configuration in which the external map acquisition unit 3 and the autonomous movement range management unit 6 are arranged in the main control device 1 has been described in the first embodiment. However, when a central control device remotely controls the host vehicle 21, the external map acquisition unit 3 and the autonomous movement range management unit 6 are not necessarily provided inside the main control device 1 and may be installed on the central control device side.

Figure 11:
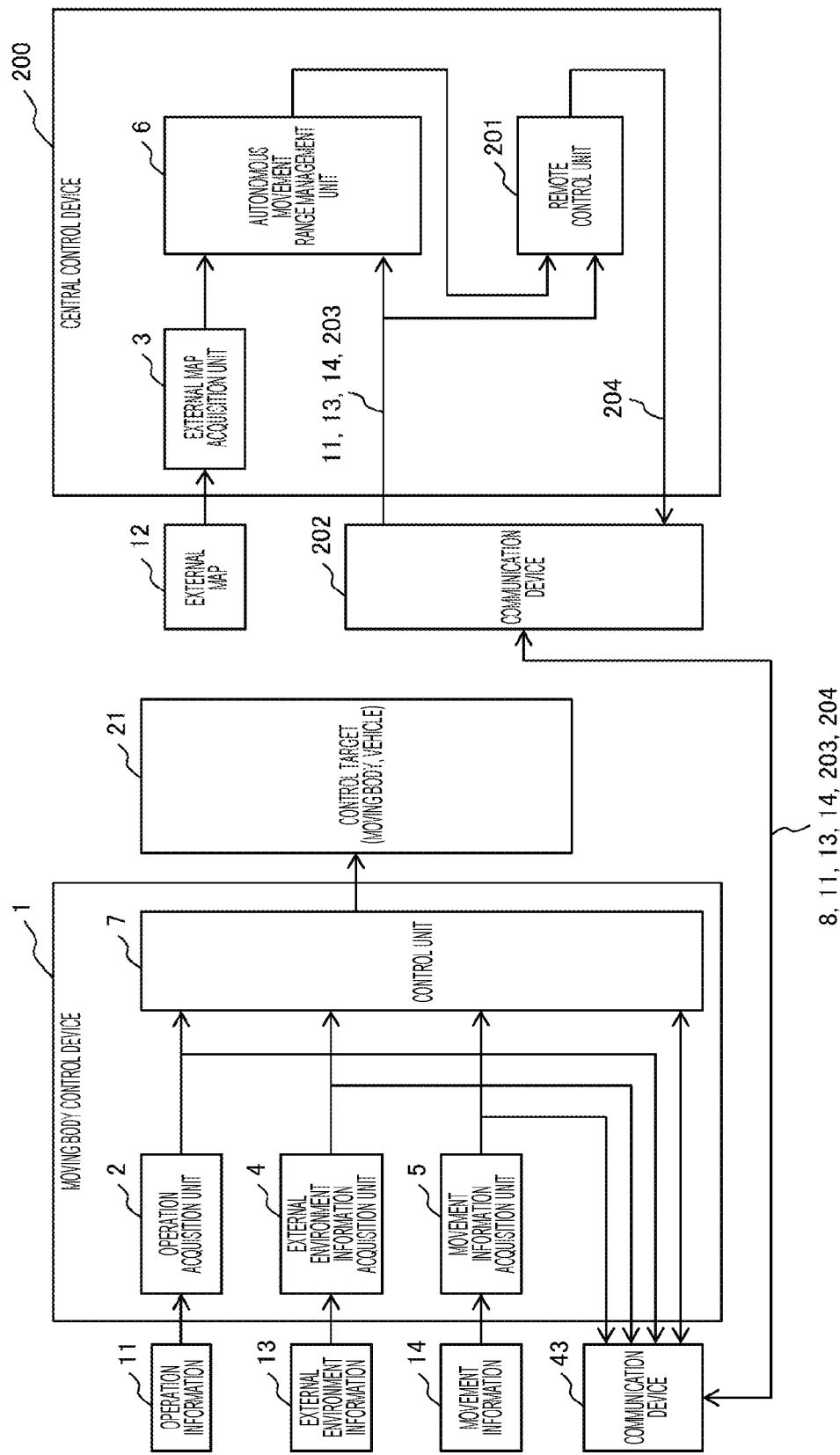
FIG. 11 is a block diagram illustrating a configuration of a moving body control device according to a second embodiment.

FIG. 11 is a block diagram illustrating a moving body control device (main control device 1) and a central control device 200 according to the second embodiment. In the present embodiment, the main control device 1 includes the operation acquisition unit 2, the external environment information acquisition unit 4, the movement information acquisition unit 5, the control unit 7, and the in-vehicle communication device 43. Further, the central control device 200 includes the external map acquisition unit 3, the autonomous movement range management unit 6, a remote control unit 201, and a center-side communication device 202. That is, the external map acquisition unit 3 and the autonomous movement range management unit 6, which are arranged in the main control device 1 in the first embodiment, have been moved to the central control device 200 side. Incidentally, operations of the operation acquisition unit 2, the external map acquisition unit 3, the external environment information acquisition unit 4, the movement information acquisition unit 5, and the autonomous movement range management unit 6 are the same as those in the first embodiment, and thus, redundant descriptions thereof are omitted hereinafter.

The in-vehicle communication device 43 and the center-side communication device 202 are communication devices that perform communication between the host vehicle 21 and the central control device 200. The operation information 11, the external environment information 13, the movement information 14, and control unit internal information 203 are transmitted constantly or intermittently from the in-vehicle communication device 43 to the center-side communication device 202. The autonomous movement map 8 and remote control information 204 are constantly or intermittently transmitted from the center-side communication device 202 to the in-vehicle communication device 43. Incidentally, as a communication method at this time, it is possible to use various forms, for example, Internet connection using Ethernet (registered trademark), Bluetooth (registered trademark) communication, communication via cellular lines (3G/4G, LTE/5G, and the like), road-vehicle communication using optical beacons, and the like.

Even in the present embodiment, the control unit 7 calculates a travel plan using at least one of the operation information 11, the external environment information 13, the movement information 14, and remote control information 204 (described below), and determines an operation of a control target (here, the host vehicle 21) based on the travel plan. Then, a control command signal for each actuator mounted on the host vehicle 21 is calculated so as to realize the operation. The basic behavior is the same as that of the first embodiment, except that the behavior of the vehicle is determined by receiving the remote control information 204 from the central control device 200, and details thereof will be described below.

Figure 12:
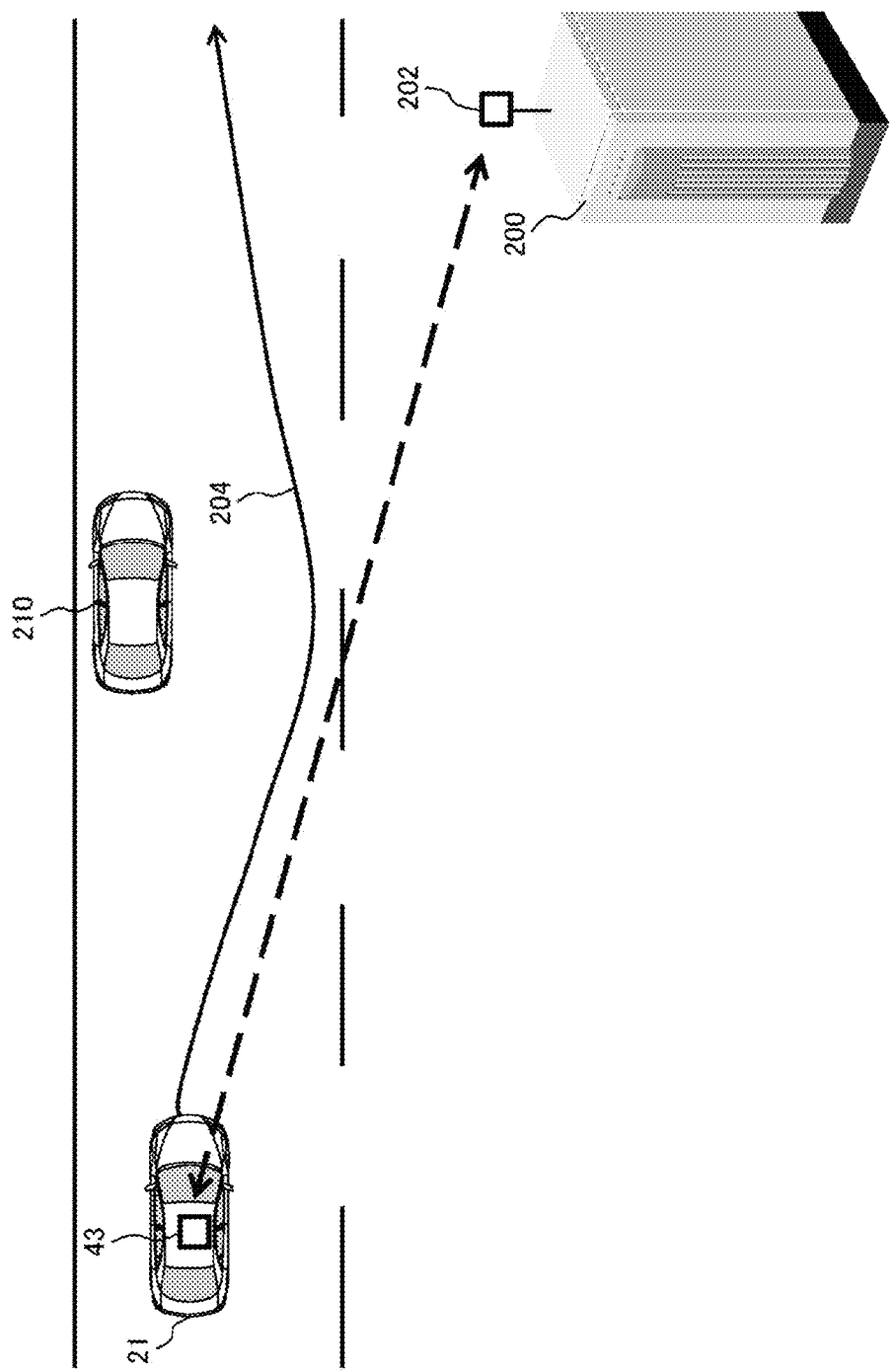
FIG. 12 is an explanatory view illustrating a configuration of the moving body control device according to the second embodiment.

The remote control unit 201 generates the remote control information 204 to remotely give an instruction to control from the central control device 200 under a condition that the host vehicle 21 is not capable of continuing autonomous movement. For example, when there is a stationary obstacle 210 (for example, a parked vehicle) ahead of the host vehicle 21 and it is determined that autonomous movement is not continuable due to insufficient determination materials to avoid the stationary obstacle 210 as illustrated in FIG. 12, the remote control information 204 (for example, a new target movement route) generated by the remote control unit 201 is transmitted to the main control device 1 by communication in order to remotely control the host vehicle 21. As a result, the host vehicle 21 avoids the stationary obstacle 210 by remote control, and restarts autonomous movement when reaching a place where the autonomous movement can be restarted.

Figure 13:
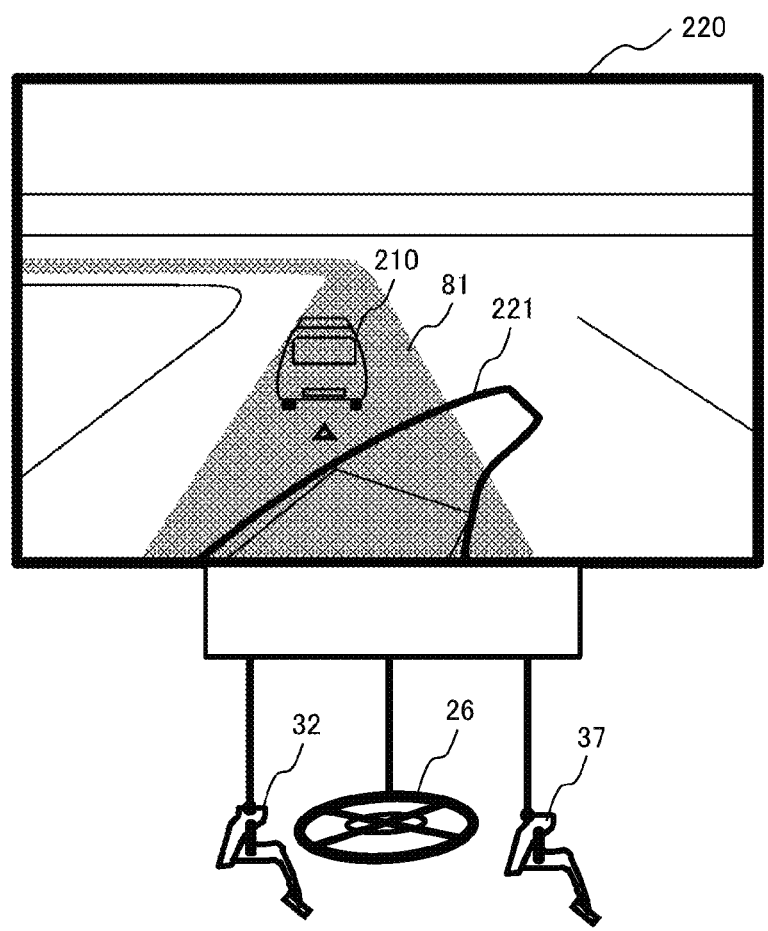
FIG. 13 is an explanatory view illustrating an example of a configuration to generate remote control information 204 according to the second embodiment.

In addition, the remote control information 204 transmitted to the host vehicle 21 may be configured to be generated as an operator operates the steering wheel 26, the accelerator pedal 37, and the brake pedal 32 during display of a front image acquired from the in-vehicle sensor 22 on a display device 220 as illustrated in FIG. 13. FIG. 13 illustrates, as an example, a situation where the stationary obstacle 210 (parked vehicle) is present on a target movement route 81 of the host vehicle 21 as in FIG. 12, and the presence of an oncoming vehicle is not visible due to a recognition range of the external environment information acquisition unit 4, so that it is difficult to make a determination regarding overtaking. At this time, the display device 220 has acquired a state ahead of the host vehicle, in particular, the stationary obstacle 210 and a road situation ahead of the host vehicle as an image, and the operator operates the steering wheel, the accelerator, and the brake at his/her own determination while viewing the image, and remotely controls the host vehicle 21. The display device 220 illustrates a remote operation guide 221 that is a future course of the host vehicle based on a current turning angle of the steering wheel. This is displayed as assistance for suitable remote control by the operator since sizes and characteristics of vehicles to be remotely controlled are various.

Incidentally, here, the case where the operator directly instructs the steering wheel, the accelerator, and the brake is illustrated, but it may be configured such that the operator instructs only some of these (for example, only the accelerator and the brake) or that the operator instructs only departure and stop (or a target speed) while still using the autonomous movement function of the main control device 1. In this case, for example, the remote operation monitor 220 may be configured as a touch pad type to receive an operation input from the operator as the remote control information 204.

As described above, the content of the remote control information 204 changes in accordance with an operation form of the operator on the center side. For example, as illustrated in FIG. 13, when the operator directly instructs the steering wheel, the accelerator, and the brake, a target steering angle, a target accelerator opening, a target brake stroke, and the like are the remote control information 204. Further, a flag of 0 or 1 to indicate departure and stop, a continuous value of the target speed, a target movement route corrected by the operator, and the like can also be the remote control information 204. The remote control information 204 to remotely control the host vehicle 21 is generated based on such operation information from the operator, and is transmitted to the main control device 1 via the center-side communication device 202.

Figure 14:
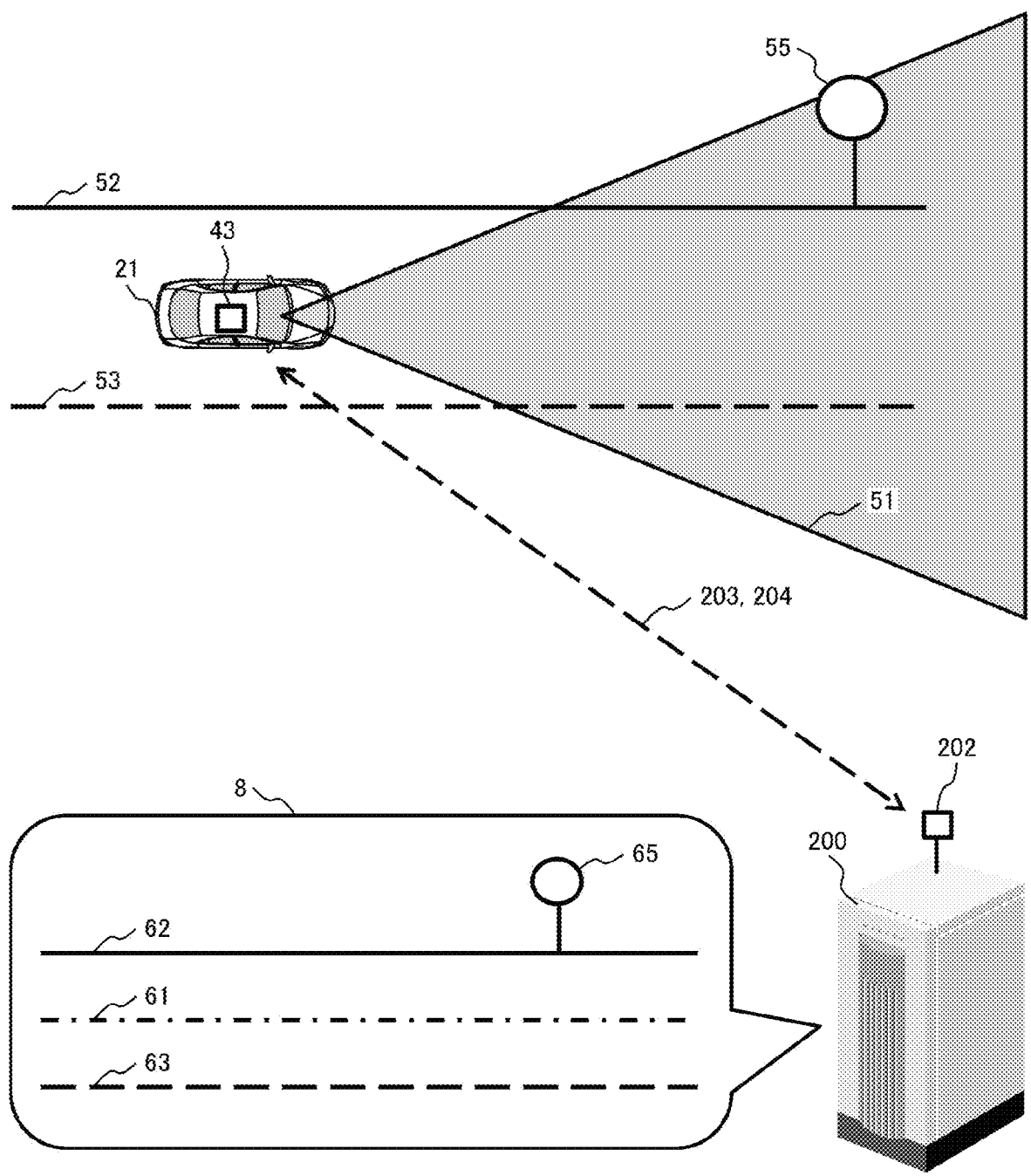
FIG. 14 is an explanatory view illustrating an operation example of an autonomous movement range management unit 6 according to the second embodiment.
Figure 15:
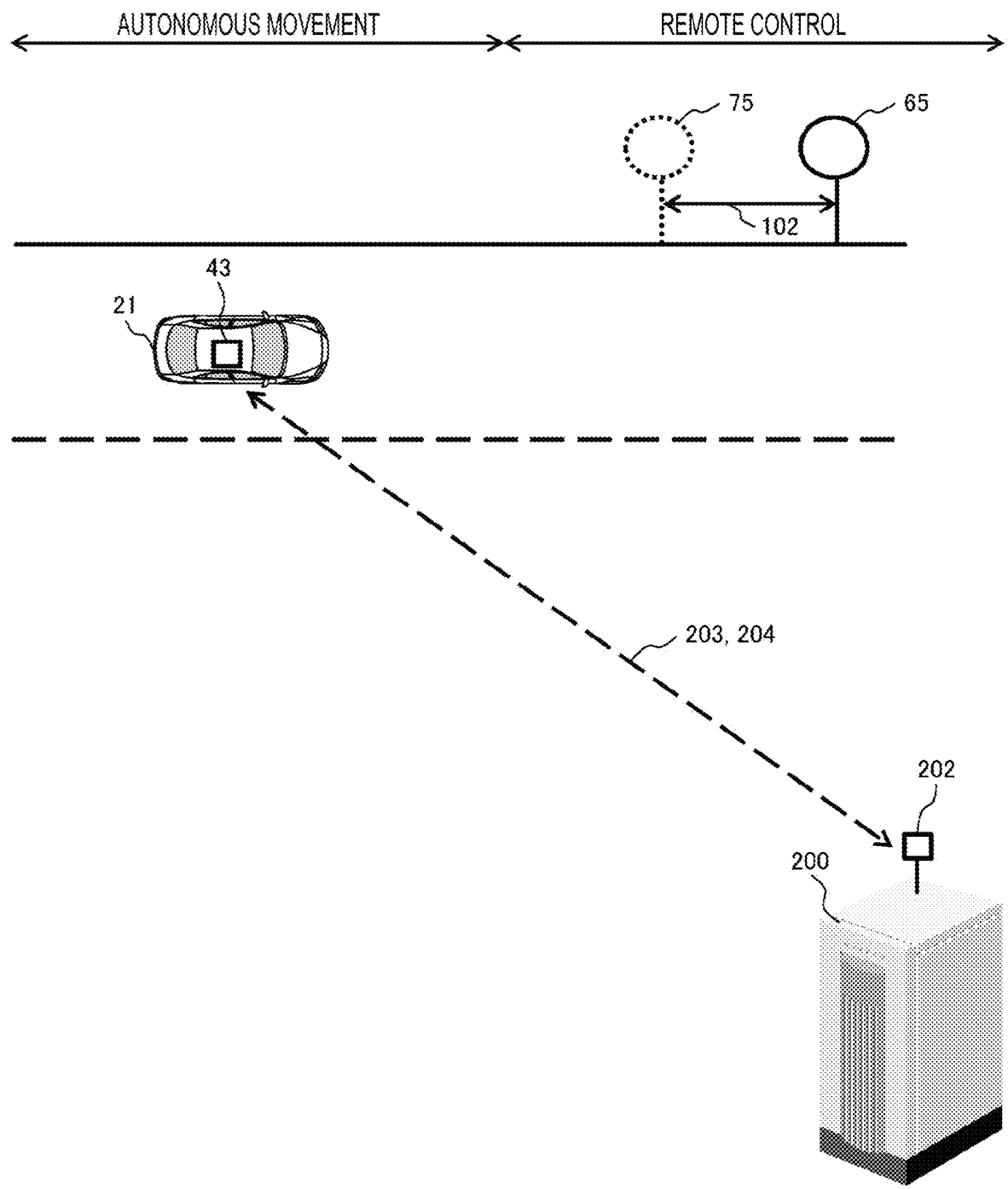
FIG. 15 is an explanatory view illustrating an operation example of a control unit 7 according to the second embodiment.

FIGS. 14 and 15 are explanatory views illustrating operation images of the main control device 1 and the central control device 200 according to the second embodiment. FIG. 14 illustrates a state where the white lines 52 and 53 and the road sign 55 existing in the detection range 51 of the in-vehicle sensor 22 are detected in a region where the host vehicle 21 travels for the first time similarly to FIG. 3A. The external environment information 13 thus obtained is transmitted to the center-side communication device 202 via the in-vehicle communication device 43, and the autonomous movement map 8 similar to that illustrated in FIG. 3B is generated by the autonomous movement range management unit 6 in the central control device 200. That is, the autonomous movement range management unit 6 of the present embodiment also stores the travel route 61 of the host vehicle 21, the solid white line 62 existing on the left side of the host vehicle 21, the broken white line 63 existing on the right side, and the road sign 65, as the autonomous movement map 8.

Next, in FIG. 15, the deviation 102 between the landmark (road sign) in the external map 12 and the road sign 65 in the autonomous movement map 8 is calculated by the autonomous movement range management unit 6. In this drawing, the deviation 102 exceeds required precision of self-position estimation precision (for example, 0.5 m), and it is determined that autonomous movement is not continuable.

Therefore, a travel plan for switching from autonomous movement to remote control is generated around this landmark 75, and control according to the remote control information 204 from the central control device 200 is executed during the remote control.

In this manner, since the central control device 200 is provided with the autonomous movement range management unit 6 according to the main control device 1 of the second embodiment, it is possible to take an option to shift to the remote control in addition to reducing the speed in a situation where the reliability of the autonomous movement map 8 decreases. The remote control enables advanced control using abundant computational resources on the central control device side and also enables monitoring by the operator, so that more stable autonomous movement can be realized.

Third Embodiment

A third embodiment of the present invention will be described with reference to FIGS. 16 to 20. Incidentally, redundant descriptions for the same parts as those in the first embodiment and the second embodiment are omitted.

Although the description has been given in the first embodiment and the second embodiment regarding the configuration in which the autonomously movable region of the autonomous movement map 8 is sequentially expanded using the external environment information 13, and the behavior of the host vehicle 21 in the expanded region is determined with reference to the external map 12. it is necessary to repeat the manual travel to collect the external environment information 13 and the test travel of the autonomous movement a plurality of times until the autonomously movable region of the autonomous movement map 8 is expanded and to finally determine whether the autonomous movement is possible for each region in these embodiments as described in FIGS. 3A to 5 and the like.

In the present embodiment, however, it is possible to reduce the number of times of manual travel and test travel of autonomous travel for a region having a spatial shape similar to a region in the autonomous movement map 8 that has been already determined as autonomously movable. In order to realize this, the autonomous movement range management unit 6 of the present embodiment compares the autonomous movement map 8 and the external environment information 13 to expand an autonomously movable region of the autonomous movement map 8 based on this comparison result.

Figure 16:
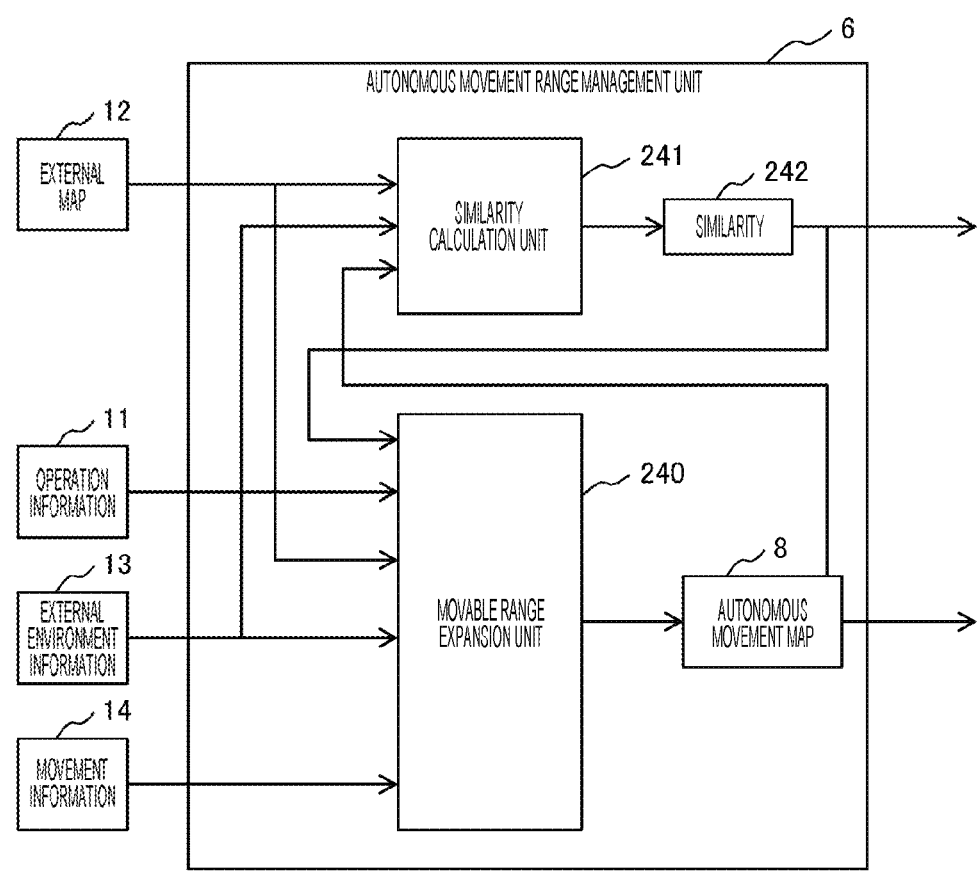
FIG. 16 is a block diagram illustrating a configuration of an autonomous movement range management unit 6 according to a third embodiment.

FIG. 16 is a block diagram illustrating a configuration of the autonomous movement range management unit 6 according to the present embodiment. This autonomous movement range management unit 6 may be arranged in the main control device 1 as illustrated in FIG. 2 of the first embodiment or arranged in the central control device 200 as illustrated in FIG. 11 of the second embodiment. The autonomous movement range management unit 6 includes an autonomous movement map expansion unit 240 and a similarity calculation unit 241.

The autonomous movement map expansion unit 240 generates the autonomous movement map 8 of the host vehicle 21 based on the operation information 11, the external environment information 13, and the movement information 14, and determines whether the host vehicle 21 is autonomously movable, for each region in the autonomous movement map 8.

Further, when a region determined as autonomously movable exists in the autonomous movement map 8, the autonomous movement range management unit 6 registers a region having a high similarity to the autonomously movable region in terms of a shape surface or the like as an autonomously movable region.

Specifically, the similarity calculation unit 241 provided in the autonomous movement range management unit 6 of the present embodiment compares the autonomous movement map 8 and the external environment information 13 for two regions in which route shapes are expected to be the same (or highly similar) inside the external map 12, and calculates a similarity 242 between the two points. Here, the similarity 242 is an index indicating how similar spatial shapes such as route shapes and a relative positional relationship between landmarks are. For example, when the similarity 242 is defined in the range of 0 to 1, the similarity=1 indicates that both regions have completely the same shape, and the similarity=0 indicates that there is no matching shape in both regions.

Then, when the autonomous movement map 8 has been already prepared for one of the two regions having the high similarity 242 and the autonomous movement map 8 has not been prepared for the other region, the autonomous movement map expansion unit 240 can expand the autonomously movable region by applying the prepared autonomous movement map 8 to the latter region without repeating the manual travel or the test travel of the autonomous travel.

Figure 17:
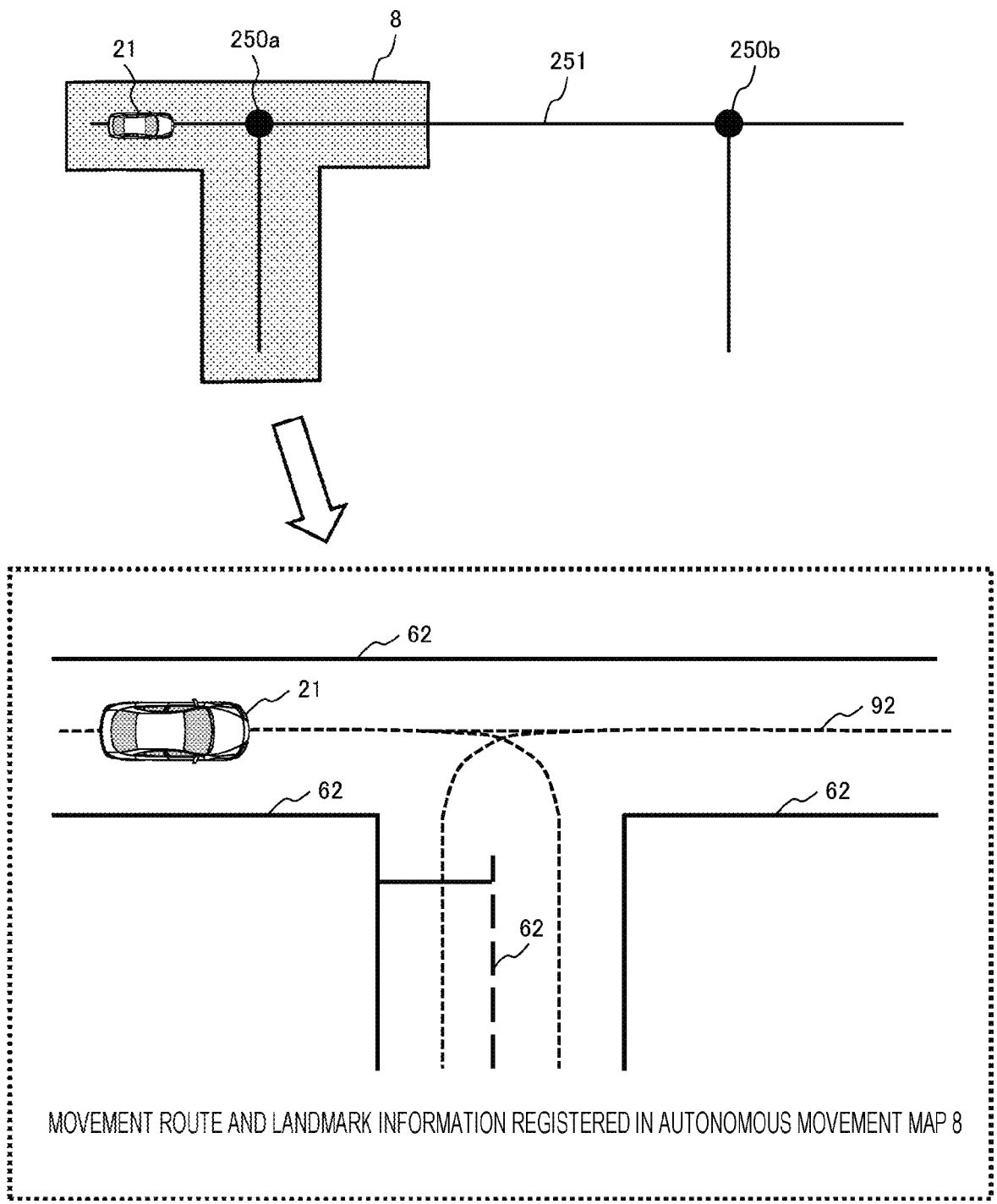
FIG. 17 is an explanatory view illustrating an example of a relationship among an external map, an autonomous movement map, and a host vehicle according to the third embodiment.

Specific examples of a behavior of the autonomous movement map expansion unit 240 and the similarity calculation unit 241 according to the present embodiment will be described with reference to FIGS. 17 to 19. The upper view of FIG. 17 is an example of the external map 12 acquired from the outside by the autonomous movement range management unit 6, and illustrates a road node 250 corresponding to an intersection and a road link 251. In this example, there are two T-shaped roads, and road nodes 250a and 250b are assigned to the T-shaped roads, respectively. Here, it is assumed that shapes around the two road nodes in the external map 12 are substantially the same. Further, the host vehicle 21 is traveling in the T-shaped autonomous movement map 8 centering on the road node 250a as illustrated in the upper view of FIG. 17. The lower view of FIG. 17 illustrates an example of a movement route 92 and the white line 62 registered in the autonomous movement map 8. Here, illustrated is an example in which a horizontal road is a narrow road having only one lane, and an intersecting vertical road is a two-lane road with a center line.

Figure 18:
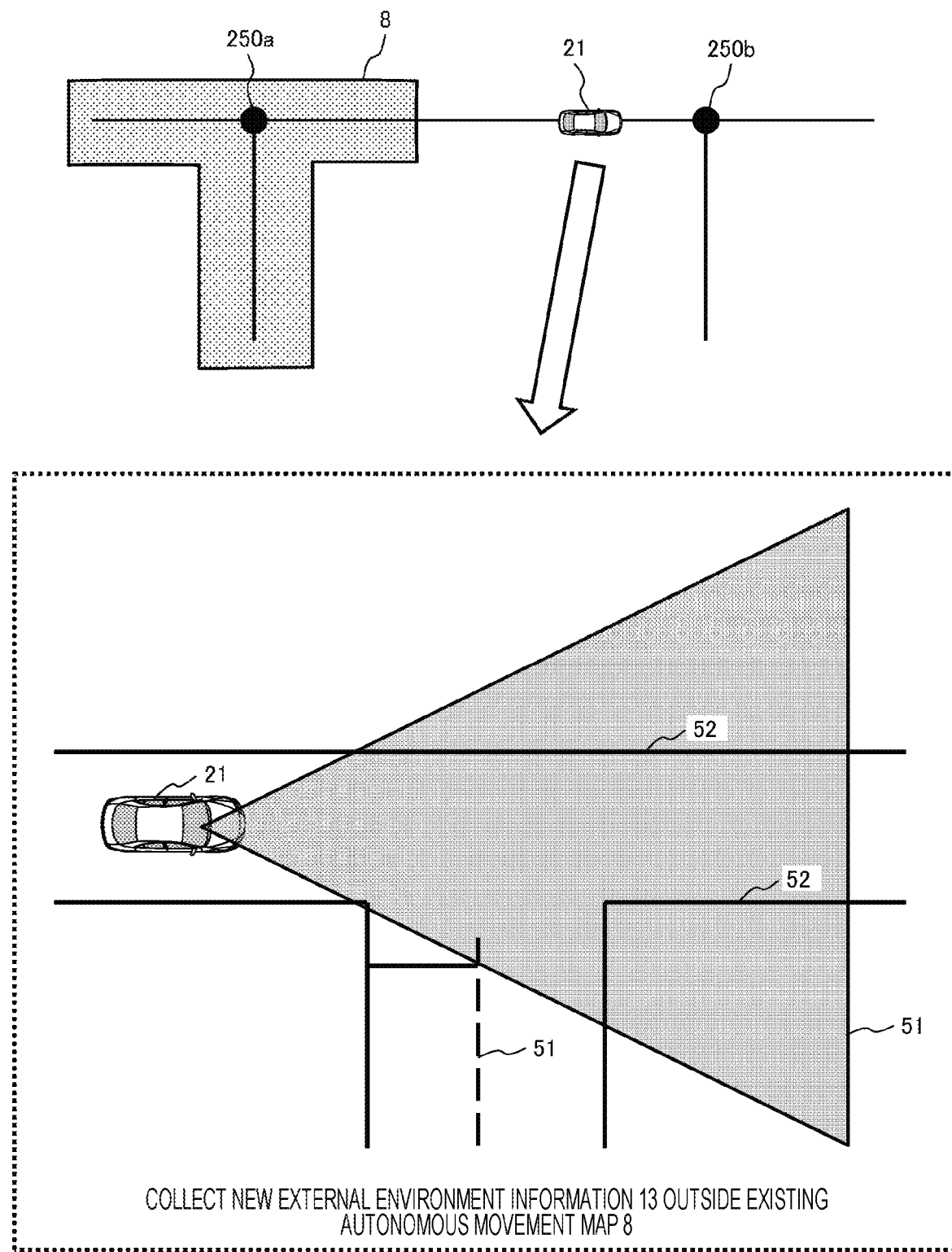
FIG. 18 is an explanatory view illustrating an operation example of the autonomous movement range management unit 6 according to the third embodiment.

On the other hand, the upper view of FIG. 18 illustrates a state where the host vehicle 21 manually travels outside the autonomous movement map 8 and is entering the T-shaped road related to the road node 250b. At this time, the in-vehicle sensor 22 detects the white line 52 on the road surface as the external environment information 13 existing in the detection range 51 as illustrated in the lower view of FIG. 18.

Figure 19A:
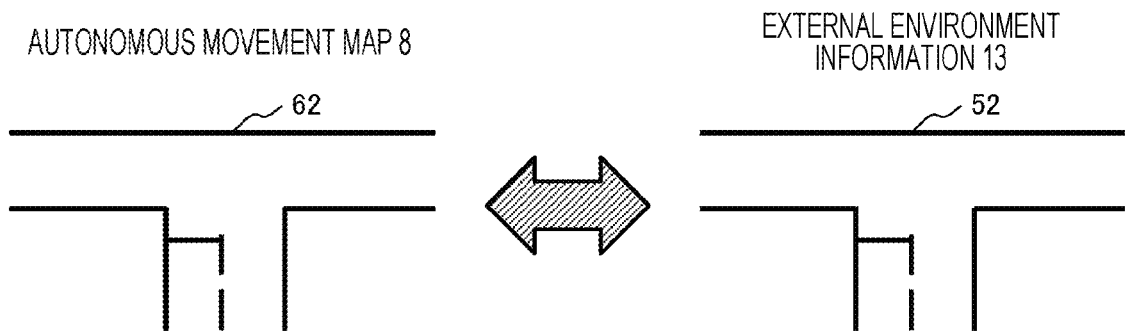
FIG. 19A is an explanatory view illustrating an operation example of the autonomous movement range management unit 6 according to the third embodiment.

At this time, the similarity calculation unit 241 compares the autonomous movement map 8 near the road node 250a and information of the external environment information 13 acquired near the road node 250b to calculate the similarity 242 as illustrated in FIG. 19A. When both shapes of the white lines are compared, it is determined that the similarity 242 between regions near the road nodes 250a and 250b is high since both the horizontal roads are narrow roads each having only one lane, and both the vertical roads are two-lane roads each having a center line (a stop line). Incidentally, as an example of a method of calculating the similarity 242, the similarity 242 can be calculated by converting the white line into information of a point group and using indices such as Sum of Absolute Difference (SAD) and Sum of Squared Difference (SSD).

Figure 19B:
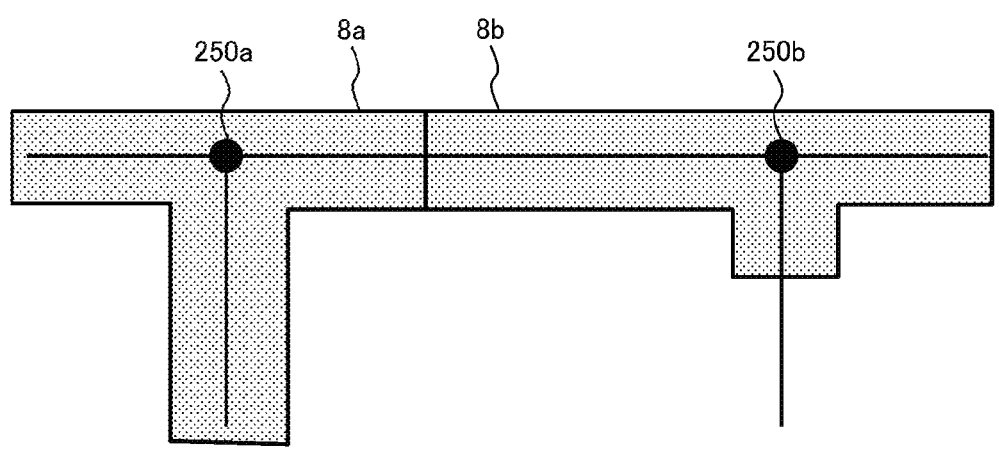
FIG. 19B is an explanatory view illustrating an operation example of the autonomous movement range management unit 6 according to the third embodiment.

When it is determined that the similarity 242 between the two regions is high as in FIG. 19A, the autonomous movement map expansion unit 240 expands the vicinity of the road node 250b to the autonomous movement map 8b in addition to the autonomous movement map 8a near the road node 250a as illustrated in FIG. 19B. As the autonomous movement map 8 is expanded in this manner, even if the number of times of travel near the road node 250b is small, the host vehicle 21 can autonomously travel in the region from the next travel.

Although the example in which the autonomous movement map is expanded with reference to the similarity 242 has been described as above, it may be configured such that a speed 101 according to a travel plan of the host vehicle 21 is changed using the similarity 242.

Figure 20A:
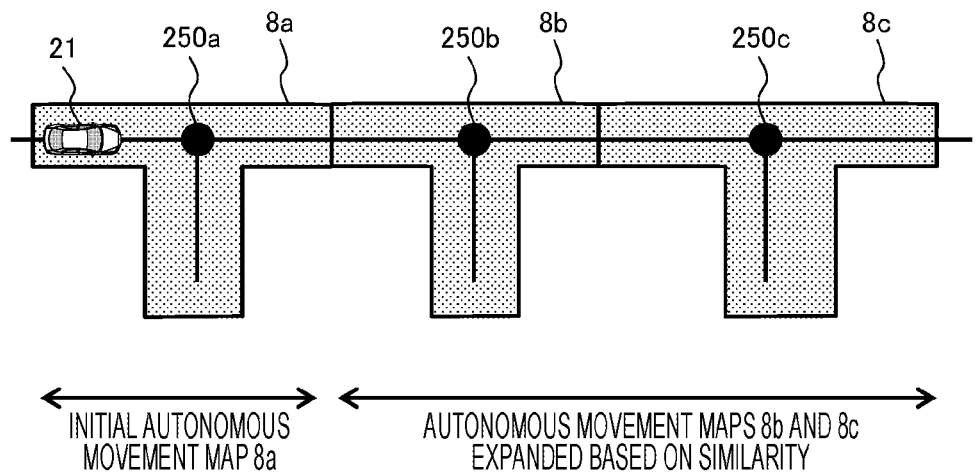
FIGS. 20A-C are an explanatory view illustrating an operation example of a control unit 7 according to the third embodiment.
Figure 20B:
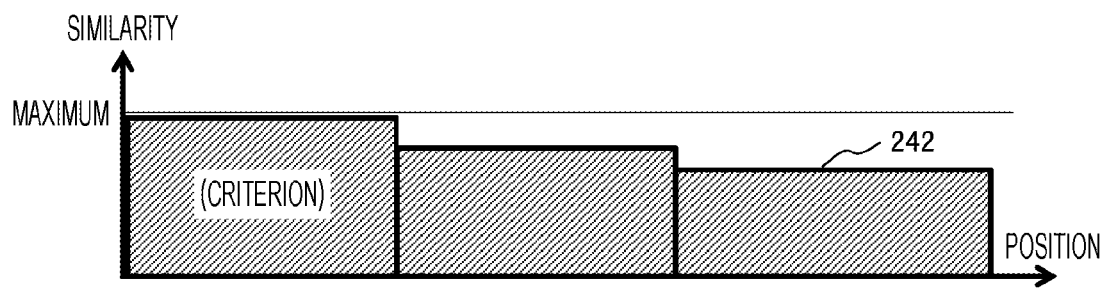
Figure 20C:
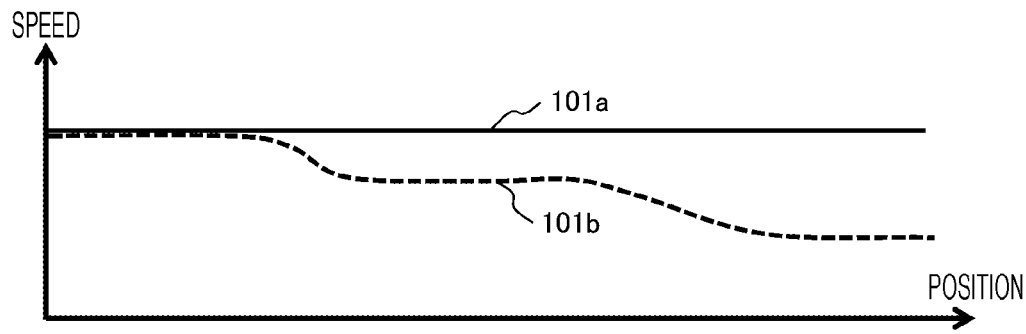

FIG. 20 illustrates an example of a change in the speed of the travel plan based on the similarity 242. FIG. 20A illustrates an example of a place where three road nodes (250a, 250b, 250c) of T-shaped roads exist in the autonomous movement map 8. Among these, the periphery of the road node 250a is a region in which an autonomous movement map 8a with high reliability has already been prepared, and the peripheries of the road nodes 250b and 251c are regions expanded as autonomous movement maps 8b and 8c based on the similarity 242 with the autonomous movement map 8a. FIG. 20B illustrates the similarity 242 between the autonomous movement maps 8b and 8c calculated based on the autonomous movement map 8a. Here, the autonomous movement map 8c has the smaller similarity 242 with the autonomous movement map 8a than the autonomous movement map 8b. Then, as illustrated in FIG. 20C, the suppressed speed 101b set in the region of the autonomous movement map 8b is lower than the initial set speed 101a set in the region of the autonomous movement map 8a, and further, the suppressed speed 101b set in the region of the autonomous movement map 8c is set to be still lower than the speed set in the region of the autonomous movement map 8b.

In this manner, the autonomously movable region is expanded in consideration of the similarity 242 between the autonomous movement map 8 and the external environment information 13 in a place that can be regarded as having the same shape on the external map 12 according to the main control device 1 of the present embodiment. Thus, the number of times of the manual travel and the test travel of autonomous movement can be reduced, which contributes to reduction in operational cost for expansion of the autonomous movement map 8. In this case, it is possible to provide a moving body control device capable of more stable autonomous movement by lowering the speed in a region in which the similarity 242 is small.

Although the case where the information stored in the autonomous movement map 8 is the landmark such as the white line on the road surface and the road sign has been described in the first to third embodiments described above, the autonomous movement map 8 may be a 3D shape (point group) related to an object around the host vehicle. In this case, a sensor (such as a laser scanner) capable of acquiring external environment information as a 3D point group is mounted on the host vehicle 21, and an iterative closest point (ICP) algorithm or the like is used, so that it is possible to estimate a current position and an advancing angle of the host vehicle 21 in the same manner.

Further, the description has been given by exemplifying the autonomous movement of the automobile as the travel control in the first to third embodiments, but the travel control is not limited to the autonomous movement. The present invention can be applied to various forms of travel control such as inter-vehicle distance control (active cruise control), lane keeping, automatic driving level 2, automatic driving level 3, and unmanned automatic driving. At this time, the autonomous movement map 8 may determine which travel control is possible, instead of determining whether the autonomous movement is possible.

Further, the description has been given by exemplifying the host vehicle in each of the first to third embodiments, but the present invention is applicable to any device that moves autonomously. For example, the present invention can be also applied to a construction machine (such as a mine dump) that performs autonomous movement, a small mobility (a single-seat small car, a motorcycle, an inverted pendulum mobility, or the like), an autonomous mobile robot, and the like.

Incidentally, the invention is not limited to the above-described embodiments and includes various modifications. For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

REFERENCE SIGNS LIST 1 main control device
2 operation acquisition unit
3 external map acquisition unit
4 external environment information acquisition unit
5 movement information acquisition unit
6 autonomous movement range management unit
7 control unit
8, 8a, 8b, 8c autonomous movement map
11 operation information
12 external map
13 external environment information
14 movement information
21 host vehicle
21a, 21b host vehicle position
22 to 25 in-vehicle sensor
26 steering wheel
27 steering torque detector
28 steering control device
29 motor
30 steering control mechanism
32 brake pedal
33 brake control mechanism
34 combined sensor
35 brake control device
37 accelerator pedal
38 stroke sensor
39 drive control device
40 drive control mechanism
41 steering wheel angle detector
43 in-vehicle communication device
44 display device
51, 51a detection range
52, 53 white line 54, 55 road sign
61 travel route registered on autonomous movement map
62, 63 white line registered on autonomous movement map
64, 65 road sign registered on autonomous movement map
71 detected object
72 undetected object
73 landmark registered on autonomous movement map
74 landmark not registered on autonomous movement map
75 landmark on external map
81 movement route in autonomously movable region
82 movement route in autonomously immovable region
83 boundary of autonomously movable/immovable region
91 movement route based on external map
92 movement route based on autonomous movement map
101 speed
101a initial set speed
101b suppressed speed
102 deviation
103 threshold
104a, 104b curvature of route
200 central control device
201 remote control unit
202 center-side communication device
203 control unit internal information
204 remote control information
210 obstacle
220 display device
221 remote operation guide
240 autonomous movement map
241 similarity calculation unit
242 similarity
250 road node (intersection)
251 road link

The invention claimed is:

1. A moving body control device for controlling a moving body comprising:
a sensor that acquires external environment information around the moving body;
a memory;
an input/output device; and
a processor communicatively coupled to the sensor, the memory and the input/output device, wherein the processor is configured to:
acquire an external map,
acquire movement information indicating a position or an advancing angle of the moving body,
generate an autonomous movement map based on the external information or the movement information,
control movement of the moving body based on the autonomous movement map, the external environment information, or the movement information,
compare the autonomous movement map with the external map,
control a behavior of the moving body based on a comparison result,
calculate a deviation between the autonomous movement map and the external map,
control the behavior of the moving body based on the deviation, and
suppress a movement speed of the moving body as the deviation increases or when the deviation exceeds a predetermined value.

2. The moving body control device according to claim 1, wherein
the deviation is a deviation between a target movement route on the autonomous movement map and a target movement route on the external map.

3. The moving body control device according to claim 2, wherein
the deviation is any of a lateral distance between the target movement route on the autonomous movement map and the target movement route on the external map, an average value per unit travel distance of the lateral distance between the target movement route on the autonomous movement map and the target movement route on the external map, and a cumulative value of the lateral distance between the target movement route on the autonomous movement map and the target movement route on the external map.

4. The moving body control device according to claim 2, wherein
the deviation is a difference in curvature at each place between the target movement route on the autonomous movement map and the target movement route on the external map.

5. The moving body control device according to claim 4, wherein
the processor suppresses a decrease in speed of the moving body in a region in which the deviation in curvature is small even if the lateral distance between the target movement route on the autonomous movement map and the target movement route on the external map is large.

6. The moving body control device according to claim 2, wherein
the deviation is a deviation between a landmark on the autonomous movement map and a landmark on the external map.

7. The moving body control device according to claim 6, wherein
the landmark is any of a paint position, an object position, and an object shape on a road surface.

8. A moving body control system comprising a first processor and a second processor, wherein
the first processor is configured to:
acquire an external map;
generate an autonomous movement map of a moving body;
remotely control the moving body; and
communicates with the moving body,
the second processor is communicatively coupled to the first processor and a sensor, the sensor acquires external environment information around the moving body;
the second processor is configured to:
acquire movement information indicating a position or an advancing angle of the moving body;
control movement of the moving body;
communicate with the first processor,
the first processor generates an autonomous movement map based on the external environment information or the movement information,
the first processor calculates a control amount to control movement of the moving body based on the external environment information or the movement information,
the second processor controls movement of the moving body based on the autonomous movement map or the control amount,
the first processor calculates a deviation between the autonomous movement map and the external map,
the second processor controls the behavior of the moving body based on the deviation, and the second processor decreases a movement speed of the moving body as the deviation increases or when the deviation exceeds a predetermined value.

9. The moving body control system according to claim 8, wherein
the first processor determines whether autonomous movement of the moving body is continuable, and calculates remote control information to remotely control the moving body until the autonomous movement is restarted when determining that the autonomous movement is not continuable, and
the second processor controls movement of the moving body based on the remote control information when receiving the remote control information.

10. The moving body control system according to claim 9, wherein
the first processor determines whether autonomous movement is continuable based on a deviation between the autonomous movement map and the external map.

11. The moving body control system according to claim 10, wherein
the first processor determines that the autonomous movement of the moving body is not continuable when the deviation exceeds a predetermined value.

12. A moving body control device for controlling a moving body comprising:
a sensor that acquires external environment information around the moving body;
a memory;
an input/output device; and
a processor communicatively coupled to the sensor, the memory and the input/output device, wherein the processor is configured to:
acquire movement information indicating a position or an advancing angle of the moving body,
generate an autonomous movement map based on the external information or the movement information,
control movement of the moving body based on the autonomous movement map, the external environment information, or the movement information,
compare external environment information acquired in a region that is not registered in the autonomous movement map with the autonomous movement map, and expands the autonomous movement map based on a result of the comparison,
calculate a similarity between the external environment information acquired in a region that is not registered in the autonomous movement map and the autonomous movement map, and adds a region in which the similarity exceeds a predetermined value to the autonomous movement map,
control movement of the moving body based on the similarity, and
suppresses a movement speed of the moving body as the similarity decreases.

13. The moving body control device according to claim 12, wherein the processor is further configured to
acquire an external map,
extract a similar place from a region that is registered in the autonomous movement map and a region that is not registered in the autonomous movement map based on the external map, compares the external environment information acquired in the region that is not registered in the autonomous movement map with the autonomous movement map, and expand the autonomous movement map based on a result of the comparison.

14. The moving body control device for controlling a moving body capable of autonomous movement, the control device comprising:
a memory;
an input/output device; and
a processor communicatively coupled to the memory and the input/output device, wherein the processor is configured to:
expand a movement range based on information of a sensor mounted on the moving body,
acquire an external map,
determine a control amount of the moving body based on a comparison between information for autonomous movement in an expanded movement range and the external map,
calculate a deviation between the autonomous movement map and the external map,
control the behavior of the moving body based on the deviation, and
suppress a movement speed of the moving body as the deviation increases or when the deviation exceeds a predetermined value.

* * * * *